United States Patent
Shafiee Ardestani et al.

(10) Patent No.: US 12,112,141 B2
(45) Date of Patent: Oct. 8, 2024

(54) ACCELERATING 2D CONVOLUTIONAL LAYER MAPPING ON A DOT PRODUCT ARCHITECTURE

(71) Applicant: SAMSUNG ELECTRONICS CO., LTD., Suwon-si (KR)

(72) Inventors: Ali Shafiee Ardestani, San Jose, CA (US); Joseph Hassoun, Los Gatos, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 249 days.

(21) Appl. No.: 16/900,819

(22) Filed: Jun. 12, 2020

(65) Prior Publication Data
US 2021/0182025 A1    Jun. 17, 2021

Related U.S. Application Data

(60) Provisional application No. 62/947,423, filed on Dec. 12, 2019.

(51) Int. Cl.
G06F 7/544    (2006.01)
G06F 9/30     (2018.01)
G06N 3/063    (2023.01)

(52) U.S. Cl.
CPC ........ *G06F 7/5443* (2013.01); *G06F 9/30105* (2013.01); *G06N 3/063* (2013.01)

(58) Field of Classification Search
CPC ........ G06F 7/5443; G06F 17/15; G06F 17/16; G06F 17/153; G06N 3/063; G06N 3/02; G06N 3/08
See application file for complete search history.

(56) References Cited

U.S. PATENT DOCUMENTS 5,285,403  A  *  2/1994  Quisquater ........... G06F 7/5443
                                                        708/523
6,061,749  A     5/2000  Webb et al.
(Continued)

FOREIGN PATENT DOCUMENTS

CN       1318232 A    10/2001
CN     104426630 A     3/2015
(Continued)

OTHER PUBLICATIONS

Mittal, Sparsh, "A survey of FPGA-based accelerators for convolutional neural networks, " Neural Computing and Applications, 2020, pp. 1109-1139.
(Continued)

*Primary Examiner* — Shawn Doman
(74) *Attorney, Agent, or Firm* — Lewis Roca Rothgerber Christie LLP

(57) ABSTRACT

A method for performing a convolution operation includes storing, a convolution kernel in a first storage device, the convolution kernel having dimensions x by y; storing, in a second storage device, a first subset of element values of an input feature map having dimensions n by m; performing a first simultaneous multiplication, of each value of the first subset of element values of the input feature map with a first element value from among the x*y elements of the convolution kernel; for each remaining value of the x*y elements of the convolution kernel, performing, a simultaneous multiplication of the remaining value with a corresponding subset of element values of the input feature map; for each simultaneous multiplication, storing, result of the simultaneous multiplication in an accumulator; and outputting, the values of the accumulator as a first row of an output feature map.

18 Claims, 26 Drawing Sheets

(56) References Cited

U.S. PATENT DOCUMENTS

| | | | |
|---|---|---|---|
| 7,050,410 | B1 | 5/2006 | Kim et al. |
| 9,418,458 | B2 | 8/2016 | Chertok et al. |
| 9,721,203 | B1 | 8/2017 | Young et al. |
| 9,836,691 | B1 | 12/2017 | Narayanaswami et al. |
| 9,904,874 | B2 | 2/2018 | Shoaib et al. |
| 10,438,117 | B1 | 10/2019 | Ross et al. |
| 10,521,488 | B1 | 12/2019 | Ross et al. |
| 10,664,751 | B2 | 5/2020 | Henry et al. |
| 10,706,147 | B1 | 7/2020 | Pohlack et al. |
| 11,250,326 | B1 | 2/2022 | Ko et al. |
| 2010/0284456 | A1 | 11/2010 | Frank |
| 2016/0162782 | A1 | 6/2016 | Park |
| 2017/0011288 | A1 | 1/2017 | Brothers et al. |
| 2017/0103306 | A1 | 4/2017 | Henry et al. |
| 2017/0103314 | A1 | 4/2017 | Ross |
| 2017/0124452 | A1 | 5/2017 | Tucker et al. |
| 2017/0316312 | A1 | 11/2017 | Goyal et al. |
| 2017/0357891 | A1 | 12/2017 | Judd et al. |
| 2018/0032859 | A1 | 2/2018 | Park et al. |
| 2018/0046894 | A1 | 2/2018 | Yao |
| 2018/0046906 | A1 | 2/2018 | Dally et al. |
| 2018/0046913 | A1 | 2/2018 | Yu et al. |
| 2018/0096226 | A1 | 4/2018 | Aliabadi et al. |
| 2018/0101743 | A1 | 4/2018 | Yang et al. |
| 2018/0129935 | A1 | 5/2018 | Kim et al. |
| 2018/0181857 | A1 | 6/2018 | Mathew et al. |
| 2018/0181858 | A1 | 6/2018 | Son et al. |
| 2018/0189642 | A1 | 7/2018 | Boesch et al. |
| 2018/0217962 | A1 | 8/2018 | Takahashi |
| 2018/0218518 | A1 | 8/2018 | Yan et al. |
| 2018/0253636 | A1 | 9/2018 | Lee et al. |
| 2018/0259970 | A1 | 9/2018 | Wang et al. |
| 2018/0285254 | A1 | 10/2018 | Baum et al. |
| 2018/0307495 | A1 | 10/2018 | Ould-Ahmed-Vall et al. |
| 2018/0307950 | A1 | 10/2018 | Nealis et al. |
| 2019/0042923 | A1 | 2/2019 | Janedula et al. |
| 2019/0065896 | A1 | 2/2019 | Lee et al. |
| 2019/0066257 | A1 | 2/2019 | Daga et al. |
| 2019/0079764 | A1 | 3/2019 | Diamond et al. |
| 2019/0114511 | A1 | 4/2019 | Gao et al. |
| 2019/0130250 | A1 | 5/2019 | Park et al. |
| 2019/0138898 | A1 | 5/2019 | Song et al. |
| 2019/0147327 | A1 | 5/2019 | Martin |
| 2019/0156201 | A1 | 5/2019 | Bichler et al. |
| 2019/0205095 | A1 | 7/2019 | Gupta et al. |
| 2019/0236049 | A1 | 8/2019 | Vantrease et al. |
| 2019/0317732 | A1* | 10/2019 | Xu .................. G06F 7/57 |
| 2019/0392287 | A1 | 12/2019 | Ovsiannikov et al. |
| 2020/0210517 | A1* | 7/2020 | Baum .............. G06F 9/30101 |
| 2021/0011732 | A1* | 1/2021 | Botimer .......... G06F 9/30032 |

FOREIGN PATENT DOCUMENTS

| | | |
|---|---|---|
| CN | 106650922 A | 5/2017 |
| CN | 108615036 A | 10/2018 |
| CN | 110110707 A | 8/2019 |
| JP | 2018-92561 A | 6/2018 |
| KR | 10-2014-0122161 A | 10/2014 |
| TW | 201706871 A | 2/2017 |
| WO | 2016/186826 A1 | 11/2016 |
| WO | WO 2016/186801 A1 | 11/2016 |
| WO | 2017142397 A1 | 8/2017 |
| WO | 2017186830 A1 | 11/2017 |
| WO | 2019/213745 A1 | 11/2019 |

OTHER PUBLICATIONS

Sombatsiri, Salita, et al., "Parallelism-Flexible Convolution Core for Sparse Convolutional Neural Networks," SASIMI 2018 Proceedings, 2018, pp. 188-193.

Office Action for U.S. Appl. No. 16/847,504 dated May 10, 2022, 16 pages.

Lascorz, A.D. et al., "Bit-Tactical: Exploiting Ineffectual Computations in Convolutional Neural Networks: Which, Why, and How", Cornell University, Computer Science, Neural and Evolutionary Computing, Mar. 9, 2018, pp. 1-14, arXiv:1803.03688v1.

Aimar et al., "Nullhop: A Flexible Convolutional Neural Network Accerlerator Based on Sparse Representations of Feature Maps," Mar. 6, 2018, arXiv:1706.01406v2 [cs.CV], pp. 1-13.

Ahmad et al., "FPGA-based Accelerators of Deep Learning Networks for Learning and Classification: A Review," Jan. 1, 2019, Date of publication 2018 00, 0000, date of current version 2018 00, 0000. Digital Object Identifier 10.1109/ACCESS.2018.2890150. DOI, arXiv:1901.00121v1[cs.NE], pp. 1-41.

Shaoli et al., "Cambricon: An Instruction Set Architecture for Neural Networks," 2016 ACM/IEEE 43rd Annual International Symposium on Computer Architecture, pp. 1-13.

Yu-Hsin et al., "Eyeriss v2: A Flexible Accelerator for Emerging Deep Neural Networks on Mobile Devices," May 20, 2019, arXiv:1807.07928v2 [cs.DC], pp. 1-21.

Jorge Albericio, Bit-Pragmatic Deep Neural Network Computing, Oct. 2017, MICRO—50, p. 385-387,390. (Year: 2017).

U.S. Office Action dated Jun. 2, 2022, issued in U.S. Appl. No. 16/552,619, 14 pages.

U.S. Office Action dated Jun. 6, 2022, issued in U.S. Appl. No. 16/446,610, 14 pages.

U.S. Notice of Allowance dated Jun. 8, 2022, issued in U.S. Appl. No. 16/552,945, 12 pages.

U.S. Office Action dated Jun. 14, 2022, issued in U.S. Appl. No. 16/552,850, 17 pages.

US Office Action dated Oct. 14, 2022, issued in U.S. Appl. No. 16/840,172 (53 pages).

US Notice of Allowance dated Sep. 21, 2022, issued in U.S. Appl. No. 16/552,945 (5 pages).

US Notice of Allowance dated Oct. 13, 2022, issued in U.S. Appl. No. 16/552,619 (10 pages).

US Notice of Allowance dated Oct. 14, 2022, issued in U.S. Appl. No. 16/552,850 (9 pages).

US Ex Parte Quayle Action dated October 17, 2022, issued in U.S. Appl. No.16/847,504 (11 pages).

US Final Office Action dated Nov. 28, 2022, issued in U.S. Appl. No. 16/446,610 (9 pages).

US Notice of Allowance dated Feb. 1, 2023, issued in U.S. Appl. No. 16/552,945 (5 pages).

US Notice of Allowance dated Feb. 13, 2023, issued in U.S. Appl. No. 16/446,610 (5 pages).

US Notice of Allowance dated Feb. 23, 2023, issued in U.S. Appl. No. 16/552,619 (5 pages).

US Notice of Allowance dated Mar. 2, 2023, issued in U.S. Appl. No. 16/552,850 (5 pages).

US Notice of Allowance dated Apr. 13, 2023, issued in U.S. Appl. No. 16/840,172 (10 pages).

Taiwanese Search Report dated Sep. 20, 2023, issued in corresponding Taiwanese Patent Application No. 109132495 (2 pages).

Chinese Notice of Allowance dated Jan. 5, 2024, issued in Chinese Patent Application No. 202010298622.2 (4 pages).

US Office Action dated Mar. 15, 2024, issued in U.S. Appl. No. 18/219,904 (10 pages).

* cited by examiner

ACCELERATING 2D CONVOLUTIONAL LAYER MAPPING ON A DOT PRODUCT ARCHITECTURE

CROSS-REFERENCE TO RELATED APPLICATION(S)

The present application claims priority to and the benefit of U.S. Provisional Patent Application Ser. No. 62/947,423, filed Dec. 12, 2019 and entitled "ACCELERATING 2D CONVOLUTIONAL LAYER MAPPING ON A DOT PRODUCT ARCHITECTURE," the entire content of which is hereby expressly incorporated by reference.

FIELD

One or more aspects of embodiments according to the present disclosure relate to processing circuits, and more particularly to a processing circuit for accelerating two dimensional (2D) convolutional layer mapping on a dot product architecture.

BACKGROUND

Neural networks may, in operation, perform tensor operations (e.g., tensor multiplications and convolutions) involving large numbers of multiplications and additions. If performed by a general purpose central processing unit, or even a graphics processing unit (which may be better suited to such a task) the performing of these operations may be relatively slow and incur a relatively high energy cost per operation. For example, in small devices (e.g., mobile, hand-held devices), which may have tightly constrained power budgets, the power consumption associated with the use of a general purpose central processing unit, or of a graphics processing unit, may not be ideal.

The above information in the Background section is only for enhancement of understanding of the background of the technology and therefore it should not be construed as admission of existence or relevancy of the prior art.

SUMMARY

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

Aspects of example embodiments of the present disclosure relate to processing circuits, and more particularly to a processing circuit for accelerating two dimensional (2D) convolutional layer mapping on a dot product architecture.

In some embodiments, a method for performing a convolution operation includes storing, by a processor, a convolution kernel in a first storage device of the processor, the convolution kernel having dimensions x by y, wherein x is a number of rows in the convolution kernel and y is a number of columns in the convolution kernel; storing, by the processor, in a second storage device of the processor, a first subset of element values of an input feature map having dimensions n by m, wherein n is a number of rows in the input feature map and m is a number of columns in the input feature map; performing a first simultaneous multiplication, by the processor, of each value of the first subset of element values of the input feature map with a first element value from among the x*y elements of the convolution kernel; for each remaining value of the x*y elements of the convolution kernel, performing, by the processor, a simultaneous multiplication of the remaining value with a corresponding subset of element values of the input feature map; for each simultaneous multiplication, storing, by the processor, result of the simultaneous multiplication in an accumulator connected to the processor; and outputting, by the processor, the values of the accumulator as a first row of an output feature map (OFM).

In some embodiments, outputting the values of the accumulator as the first row of the OFM includes adding, by the processor, results of plurality of simultaneous multiplications stored in the accumulator to generate the first row of the OFM. In some embodiments, the first storage device includes a cache memory connected to the processor, and wherein the second storage device includes a plurality of registers located in a processing element (PE) of a multiply-accumulate (MAC) tile of the processor, wherein the plurality of registers are 9-bit registers.

In some embodiments, the method further includes shifting, by the processor, the first subset of element values one register to the left in the plurality of registers. In some embodiments, the method further includes broadcasting, by the processor, the first element value from among x*y elements of the convolution kernel to the second storage device; and broadcasting, by the processor, a second element value from among the x*y elements of the convolution kernel to the second storage device, wherein the first subset of element values of the input feature map includes values in first to p-th column of first row of the input feature map, and a second subset of element values of the input feature map includes values in second to (p+1)-th column of first row of the input feature map.

In some embodiments, the convolution kernel having the dimension x by y is a weight matrix, the weight matrix including a plurality of weight values, the plurality of weight values of the weight matrix are being stored in a cache memory connected to the processor, and wherein the input feature map having the dimension n by m includes a plurality of activation values. In some embodiments, the processor includes a plurality of multiply-accumulate (MAC) tiles, each MAC tile including an array of processing element (PE) including a plurality of PE rows and a plurality of PE columns, each PE column of the plurality of PE columns including a plurality of PEs and an adder tree.

In some embodiments, each MAC tile further includes a cache memory including a plurality of parallel activation lanes, each activation lane being corresponding to a row of the array of PEs in the MAC tile. In some embodiments, each PE of the plurality of PEs includes a plurality of registers configured to store the plurality of activation values of the input feature map, a multiplier connected to the plurality of registers and configured to multiply activations from the input feature map by the weight values from the cache memory, and a PE accumulator connected to the multiplier and configured to add an output from the multiplier to a value from the plurality of registers and store the result in the plurality of registers. In some embodiments, the array of PEs in the MAC tile includes eight PE columns, wherein each PE column of the eight PE columns of the MAC tile includes sixteen PEs.

In some embodiments, a system for performing a convolution operation includes a memory and a processor in communication with the memory, wherein the processor is configured to: store, in a first storage device of the processor, a convolution kernel having dimensions x by y, wherein x is a number of rows in the convolution kernel and y is a number of columns in the convolution kernel; store, in a second storage device connected to the processor, a first subset of element values of an input feature map having dimensions n by m, wherein n is a number of rows in the input feature map and m is a number of columns in the input feature map; perform, a first simultaneous multiplication of each value of the first subset of element values of the input feature map with a first element value from among the x*y elements of the convolution kernel; for each remaining value of the x*y elements of the convolution kernel, perform, a simultaneous multiplication of the remaining value with a corresponding subset of element values of the input feature map; for each simultaneous multiplication, store, result of the simultaneous multiplication in an accumulator connected to the processor; and output the values of the accumulator as a first row of an output feature map (OFM).

In some embodiments, the processor is further configured to output the values of the accumulator as the first row of the OFM by adding results of plurality of simultaneous multiplications stored in the accumulator to generate the first row of the OFM. In some embodiments, the first storage device includes a cache memory connected to the processor, and wherein the second storage device includes a plurality of registers located in a processing element (PE) of a multiply-accumulate (MAC) tile of the processor, wherein the plurality of registers are 9-bit registers. In some embodiments, the processor is further configured to: shift, the first subset of element values one register to the left in the plurality of registers.

In some embodiments, the processor is further configured to: broadcast the first element value from among x*y elements of the convolution kernel to the second storage device; and broadcast a second element value from among the x*y elements of the convolution kernel to the second storage device. In some embodiments, the convolution kernel having the dimension x by y is a weight matrix, the weight matrix including a plurality of weight values, the plurality of weight values of the weight matrix are being stored in a cache memory connected to the processor, and wherein the input feature map having the dimension n by m includes a plurality of activation values, wherein the processor includes a plurality of multiply-accumulate (MAC) tiles, each MAC tile including an array of processing element (PE) including a plurality of PE rows and a plurality of PE columns, each PE column of the plurality of PE columns including a plurality of PEs and an adder tree.

In some embodiments, each MAC tile further includes a cache memory including a plurality of parallel activation lanes, each activation lane being corresponding to a row of the array of PEs in the MAC tile, wherein the array of PEs in the MAC tile includes eight PE columns, wherein each PE column of the eight PE columns of the MAC tile includes sixteen PEs. In some embodiments, each PE of the plurality of PEs includes a plurality of registers configured to store the plurality of activation values of the input feature map, a multiplier connected to the plurality of registers and configured to multiply activations from the input feature map by the weight values from the cache memory, and a PE accumulator connected to the multiplier and configured to add an output from the multiplier to a value from the plurality of registers and store the result in the plurality of registers.

In some embodiments, a method includes performing a first simultaneous multiplication, by a processor, of each value of a first subset of element values of a first matrix with a first element value from among x*y elements of a second matrix; for each remaining value of the x*y elements of the second matrix, performing, by the processor, a simultaneous multiplication of the remaining value with a corresponding subset of element values of the first matrix; for each simultaneous multiplication, storing, by the processor, result of the simultaneous multiplication in an accumulator connected to the processor; and outputting, by the processor, the values of the accumulator as a first row of an output feature map (OFM).

In some embodiments, the method further includes storing, by a processor, the second matrix in a first storage device of the processor, the second matrix having dimensions x by y, wherein x is a number of rows in the second matrix and y is a number of columns in the second matrix; storing, by the processor, in a second storage device connected to the processor, the first subset of element values of the first matrix having dimensions n by m, wherein n is a number of rows in the first matrix and m is a number of columns in the first matrix; and storing, by the processor, in the second storage device, a second subset of element values of the first matrix, wherein the first subset of element values of the first matrix includes values in first to p-th column of first row of the first matrix, the second subset of element values of the first matrix includes values in second to (p+1)-th column of first row of the first matrix.

BRIEF DESCRIPTION OF THE DRAWINGS

These and other features of some example embodiments of the present disclosure will be appreciated and understood with reference to the specification, claims, and appended drawings, wherein:

DETAILED DESCRIPTION

Figure 1:
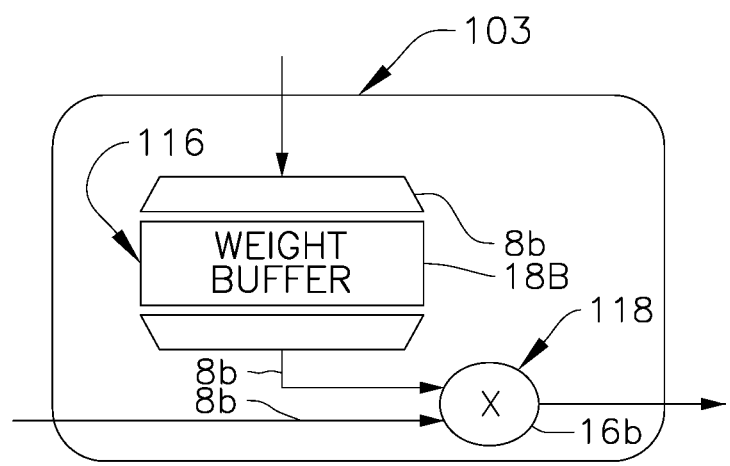
FIGS. 1-2 illustrate example architectures of a processing element (PE), according to some embodiments of the present disclosure.

The detailed description set forth below in connection with the appended drawings is intended as a description of some example embodiments of a system and method for accelerating two dimensional (2D) convolutional layer mapping on a dot product architecture provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Convolutional neural networks (CNN) are types of neural networks that may be used for image processing, for example, image classification, image clustering, object recognition, etc. CNNs may be desirable over related art machine learning methods on applications such as image classification, tracking, detection, etc. CNNs may be used to extract features from an input image, for example, a wide range of features from an input image may be extracted through convolution using filters having weights that are learned during the training of the neural network. The extracted features may be combined to determine an output. However, CNNs may be involved in increased number of computational operations compared to the related art machine learning methods.

A CNN may include a convolution layer and a fully-connected layer. The convolution layer and the fully-connected layer may be different in terms of performing computation and memory access. For example, in CNN, the fully connected layer may perform fewer computations compared to the convolution layer, however, may access memory intensively and therefore may be largely responsible for the performance degradation of the CNN. Convolution layers in the CNN may hold most of computations and may have increasing number of parameters compared to the fully connected layer. A convolutional layer may be a layer in a neural network in which the neurons share weights. The input to the convolutional layer may be an input image or an output of a preceding layer, and the output of the layer may be a feature map.

In CNN, 2D data arrays may be used as input of the convolution layer and in such a case the output of the convolution layer may be 2D data arrays as well. With the 2D input arrays, the convolution layer may perform computations that are 2D convolutions sliding over the input arrays. In CNN computations, a kernel or a filter may be a 2D array of weights, which may be repeatedly used to perform convolution over the input 2D arrays. For example, the kernel may slide over the 2D input data to perform an elementwise multiplication with the section of the input array it is currently on, and then add the results into an output pixel (e.g., each output pixel is a dot product of the kernel and a corresponding portion of the 2D input data). This process may be repeated for every location the kernel slides over to convert a 2D array of features (e.g., 2D input data array on input feature map) into another 2D array of features (e.g., 2D output data array or output feature map).

In CNN, 3D data arrays may be used as inputs to the convolution layer. For example, a 3D input array having dimension of H×W×D may be convolved with F kernels of dimension H×W×D and a stride of length S. Stride may be defined as the step size of the kernel when sliding along the input array. For example, a stride of 1 may indicate that the kernel slides through the input array element by element. Each 3D kernel of dimension H×W×D from among the F kernels may slide with a stride S across the 3D input array and during each shift, each element or weight of the 3D kernel is multiplied and added with each pair-wise input element from the overlapping region of the 3D input array. As such, CNN may perform an extensive number of iterative operations compared to a fully connected network (e.g., Filter size=h*w*D; Input size=H*W*D).

The convolution layer of the CNN which may perform multiply-accumulate (MAC) operations, may use most of the execution time of the CNN. A MAC operation may compute the product of two numbers and may add that product to an accumulator. Neural network accelerators (e.g., Resnet-152) may reduce the number of computations in convolution layers or the number of memory accesses in the CNN. In order to reduce the execution time of the convolution layer, high speed accelerators may use specific structure that accelerate the computation performed in the convolution layer by executing a large amount of MAC operations in parallel by the PEs.

Neural Networks with 2D convolutions, such as MobileNet, may be used to reduce the number of computational operations in the convolution layer. For example, to perform high speed MAC operation, information in the input array of the convolution layer or input feature map information and filter or kernel weight information of current layer may be uploaded to the memory. The uploaded information may be processed by processing elements (PE) which are based on MAC operation to generate the output feature map information for next layer, which are then stored in the memory. A neural processor including MAC tiles or MAC array may take advantage of sparsity in the input feature map (IFM) to accelerate the completion of a calculation, by advancing certain multiplication and addition operations out of turn, so as to make use of a multiplier that would otherwise perform a multiplication by zero, when an element of the IFM equals zero.

In some cases, 2D convolution layers of the CNN may map poorly on dot product architectures, because the 2D convolution layer may only utilize a fraction of a 16×16 MAC array (for example, only the diagonal elements of the 16×16 MAC array). For example, in some cases, the under-utilization of the dot product architectures may be caused by only using one out of the 16 rows of the MAC array at a time.

In some embodiments, a neural processor may be configured to calculate a convolution or a tensor product of an input feature map (IFM) (or a tensor of "activations") with a multi-dimensional array (or tensor) of weights (e.g., kernel), to form an output feature map (OFM).

In some embodiments, the neural processor includes a plurality of static random access memory (SRAM) bank sets. In some embodiments, each of the plurality of SRAM bank sets includes four SRAM banks. In some embodiments, the plurality of SRAM bank sets are connected to MAC tiles through an interconnect fabric, for example, an input feature map (IFM) delivery fabric. In some embodiments, the interconnect fabric or the IFM delivery fabric may bring input activation maps stored in SRAM bank sets to MAC tiles for subsequent computation.

In some embodiments, the MAC tiles are also connected to SRAM bank sets via another interconnect fabric, for example, an output feature map (OFM) delivery fabric that transmits computed results from MAC tiles to SRAM bank sets for storage. In some embodiments, the MAC tiles are also connected to a reduction tree or a reduction fabric. In some embodiments, the IFM delivery fabric may be a segmented bus, and, as a result, each one of the SRAM bank sets may be associated with a corresponding one of the MAC tiles.

In some embodiments, each MAC tile may contain a PE array of PE columns. In some embodiments, each PE column contains a plurality of PEs and an adder tree. In some embodiments, each PE array contains eight PE columns and each PE column contains sixteen PEs and an adder tree.

In some embodiments, each PE may include a plurality of registers, e.g., a register file containing 18 registers (e.g., 18 9-bit registers) that may be referred to as "weight buffers", and a multiplier. In some embodiments, the multiplier multiplies input activations by weights. Subsequently, the adder tree in each MAC column sums up (e.g., fold or accumulate) resulting products from the plurality of PEs (e.g., sixteen PEs) in the column to form a dot product.

In some embodiments, each MAC tile also includes a cache. In some embodiments, the cache may reduce SRAM reads for input feature maps by caching IFM values received from SRAM. In some embodiments, the cache contains a plurality of parallel "activation lanes," each activation lane corresponding to a "row" of the PE array in the MAC column.

In some embodiments, input activations from cache may be fetched (e.g., fetched into an IFM activations buffer) while also omitting zero-valued activations, when possible, to realize sparse activation computation. Next, numerical type of activations may be converted into sign-and-8 bit-magnitude format. The resulting converted plurality of activation values may be broadcasted in parallel to the PE array such that each activation lane brings an input activation value to the corresponding multiplier units in the corresponding row of PEs. In some embodiments, each column of PEs, the results are accumulated in an accumulator in the return unit. In some embodiments, after accumulation of product values in possible multiple cycles, the result will be returned back to SRAM. The return unit quantize back the large accumulated value to small precision, once all the computations for a pixel is added together.

Figure 2:
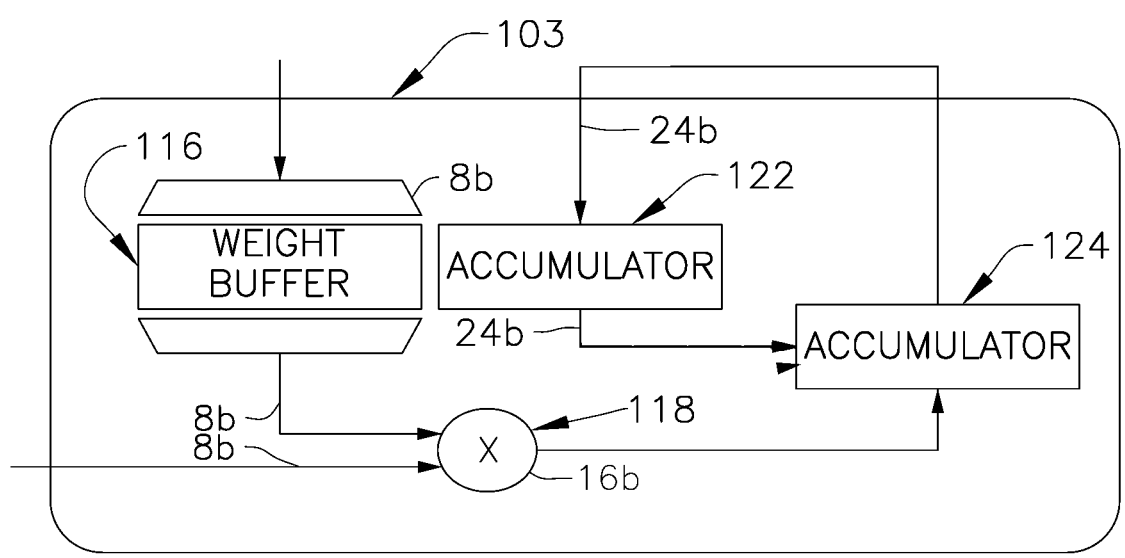

FIGS. 1-2 illustrate example architectures of a PE. In some embodiments, as shown in FIGS. 1-2, each PE 103 may also contain an accumulator register 122. In some embodiments, an "accumulator" (e.g., accumulator register 122) may be a combination of an adder and a register that is configured to add an input value to the contents of the register, and overwrite the contents of the register with the sum. In some embodiments, the PE 103 may also incorporate another accumulator register 124 in addition to the accumulator register 122. In such a case, the accumulator register 122 may be part of the weight buffer 116. The accumulator register 124 may be configured to add the output from the multiplier 118 to an input value from the weight buffer 116 to the contents of the register, and the accumulator register 122 may be configured to store the sum to the weight buffer 116, or overwrite the contents of the weight buffer 116 with the sum from the accumulator register 124.

In some embodiments, the weight buffer 116 may have eighteen 1 Byte (B) elements. In some embodiments, in 2D convolution mode, twelve of the eighteen 1B elements of the weight buffer 116 may be used to store activations and rest of the six 1B elements of the weight buffer 116 may be decomposed into two 3B accumulators (e.g., accumulator registers 122 and 124).

In some embodiments, the two accumulator registers 122 and 124 may accumulate and store the result of the prior round of accumulation. While, in some embodiments, one of the accumulator registers 122 and 124 may be used for accumulating, and the stored result from the other one of the accumulator registers 122 and 124 may be sent to return unit gradually. This way, stall time may be minimized.

Figure 3:
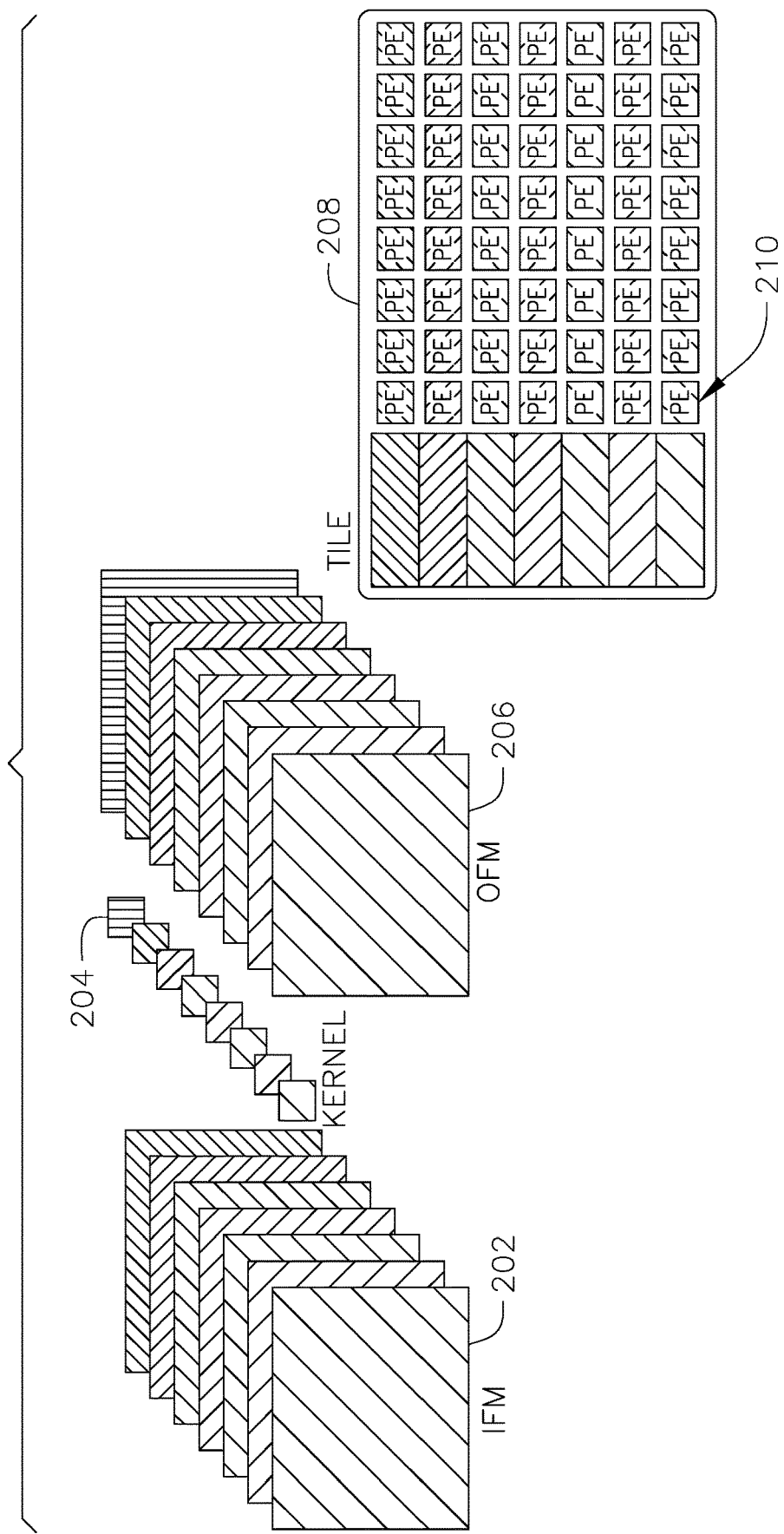
FIG. 3 illustrates mapping planar convolution to a multiply-accumulate (MAC) tile, according to some embodiments of the present disclosure.

FIG. 3 illustrates mapping planar convolution to a MAC tile, according to some embodiments of the present disclosure.

As shown in FIG. 3, an IFM 202 with a certain length (e.g., a length of sixteen) may be referred to as a "IFM slice". An IFM slice may have planar coordinates (x, y) and a depth channel index d associated with it (e.g., IFM [x, y, d:d+15]). In some embodiments, a tile 208 (e.g., a MAC tile) may receive one IFM slice at a time from on-chip SRAM (e.g., SRAM bank sets) containing a 3D IFM tensor, where each input IFM slice contains values for sixteen depth channels from index, e.g., d to d+15, inclusive at planar location (x, y) in the input layer (in FIG. 2 only seven channels or depth channels have been shown).

Similarly, an OFM vector 206 with a certain length (e.g., the length of eight) may be referred to as an "OFM slice". An OFM slice may have planar coordinates (x, y) and depth channel index d associated with it as indices into the associated OFM tensor (e.g., OFM [x, y, d:d+7]). In some embodiments, the tile 209 may produce OFM slices as output. In some embodiments, the output OFM vectors 206 (OFM slices) from tiles 208 may need to be further reduced by the reduction tree or reduction fabric to complete the OFM vector computation, before transmitting the final OFM vector result over OFM delivery fabric for storage in SRAM banks.

In the example embodiment of FIG. 3, the kernel 204 may have length and width different than the IFM 202, however, the kernel 204 may have the same depth as the IFM 202. In some embodiments, the kernel 204 may slide along height and width of the IFM 202, and at each sliding position, element-wise multiplication and addition may be performed, which results in a single element of an OFM slice. In order to determine the OFM vector 206 with depth channel index d (e.g., OFM [x, y, d:d+7]), eight kernels 204 (e.g., same number of kernels as the depth of the OFM vector 206) may be applied to the IFM 202, where each kernel 204 from among the eight kernels may produce an OFM channel.

In some embodiments, the tile 208 may include sixteen rows or sixteen lanes and eight columns. In some embodiments, during each cycle of operation (e.g., during each cycle of the clock), each of the sixteen multipliers in a column 210 may form a respective product from two factors at its inputs, each of the adders may form a sum of some of those sixteen products at its inputs.

Further details of the computation of OFM 206 using a neural processor incorporating tiles (e.g., tile 208) is discussed with respect to FIGS. 1C-1H of U.S. patent application Ser. No. 16/446,610, filed on Jun. 19, 2019, the entire content of which is hereby incorporated by reference.

Figure 4:
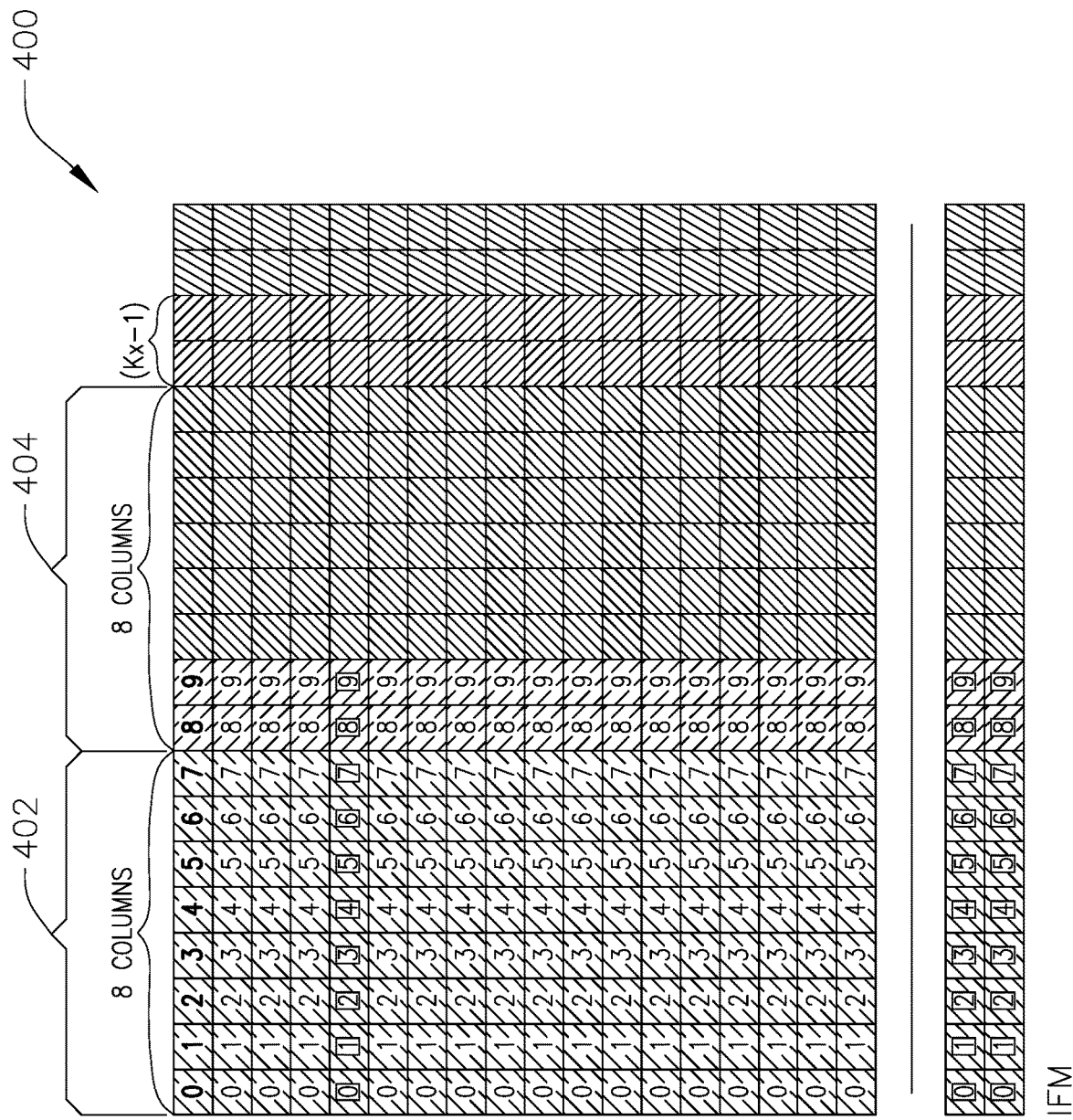
FIG. 4 illustrates an example two-dimensional (2D) input feature map (IFM), according to some embodiments of the present disclosure.

FIG. 4 illustrates an example 2D IFM 400. In some embodiments, FIG. 4 shows how an IFM is split to pieces, where each piece is processed by a MAC tile (either using the same tile in different rounds or multiple tiles at the same time). In some example embodiments, during 2D (e.g., depthwise) convolution operation, the 2D IFM 400 may be divided into sections (e.g., 402, 404) with eight columns wide (e.g., labeled bit 0 to bit 8 in this example). Each of the eight column wide sections 402, 404 may be processed in sequence. In some embodiments, each tile (e.g., a MAC tile) of a neural processor may process sixteen output channels. In some embodiments, the tile array of a neural processor may be configured to process the maximum number of output channels (e.g., all of the output channels of an output feature map (OFM)). For example, to process 64 output channels, the tile array of a neural processor may be configured as 4×4 tile array, so that 64 (e.g., 4×16 rows) channels may be processed at one time.

In some embodiments, because, there are four channels that feed the tile (e.g., a MAC tile) from SRAM, the first output pixel may take $((2+Kx-1)*Ky)$ cycles to calculate, which may be the number of cycles required to read the data for the first pixel. In this case, Kx and Ky are the dimensions of the 2D kernel. In some embodiments, each additional output pixel may take $(Kx*Ky)$ cycles to calculate as SRAM reads may be overlapped with the calculations using the IFM already placed in the weight register. In some embodiments, to process each column of the IFM (e.g., IFM 400), additional data equal to the kernel minus 1 columns may be desired to process the IFM 400 columns in an IFM section (e.g., section 402) (for example, for a 2D kernel of size 3×3 (e.g., 3 rows and 3 columns), 3−1=2 additional columns of data may be needed to process the IFM 400, as shown in FIG. 4). Moreover, the hardware inside each tile (e.g., a MAC tile) of a neural processor may be rearranged and repurposed, in some embodiments.

In some embodiments, methods for computing convolutions may take into consideration the repeated use of the same convolution kernel (e.g., the same weights) across an input feature map (IFM) and may also take into consideration the repeated use of the same values of the IFM for multiple output values of the OFM. Such methods for computing convolution may maintain an accumulator for each output pixel of a current row of the OFM. In such a case, for each weight of the convolution kernel, the elements (e.g., activations) of the IFM are loaded in the weight registers. The loaded elements of the IFM are be multiplied by the current weight of the convolution kernel, and added to the accumulator. Next, the loaded elements are shifted to be multiplied by the next weight of the kernel, and additional elements from the IFM are loaded to the weight registers to be multiplied by the next weight of the convolution kernel. As a result, multiple values of the IFM that are multiplied by the same weight of the convolution kernel, are multiplied by that same weight in parallel, thereby increasing the number of operations completed per clock cycle, and previously loaded values are reused for multiplication by the next weight, thereby reducing the amount of data that is transferred.

Figure 5A:
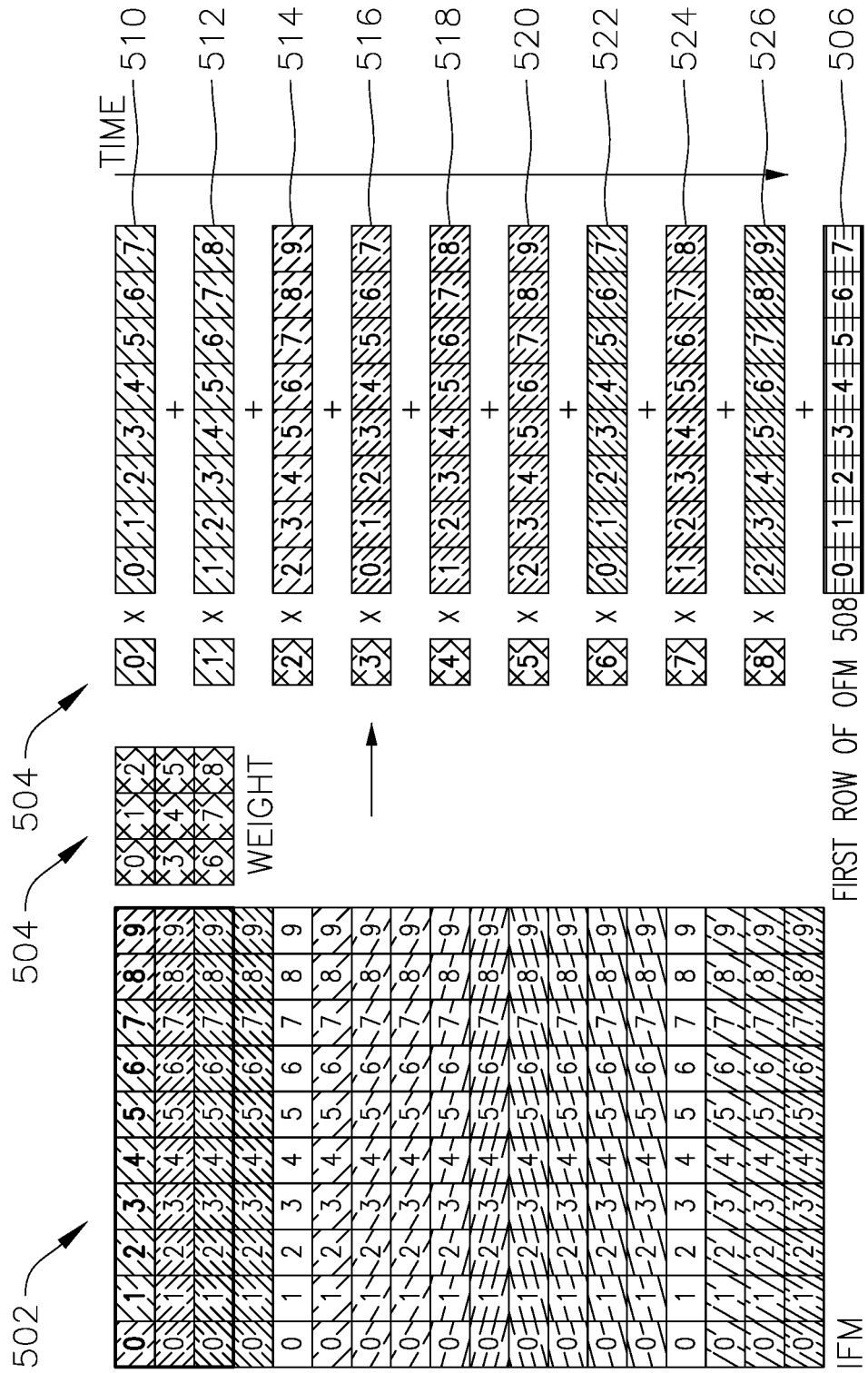
FIGS. 5A-5M illustrate in details regarding the determination of a first row of an output feature map (OFM), according to some embodiments of the present disclosure.
Figure 5B:
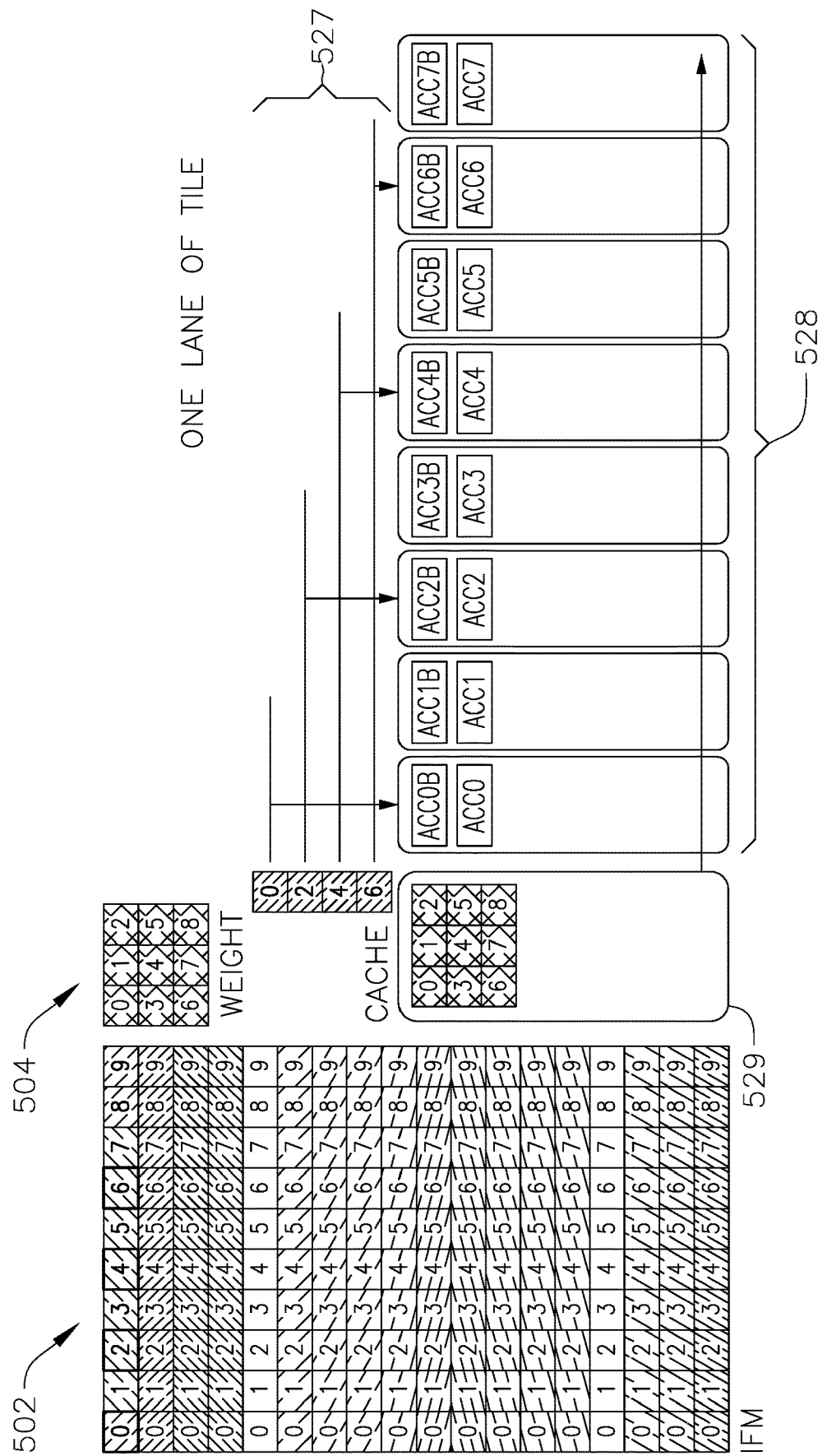
Figure 5C:
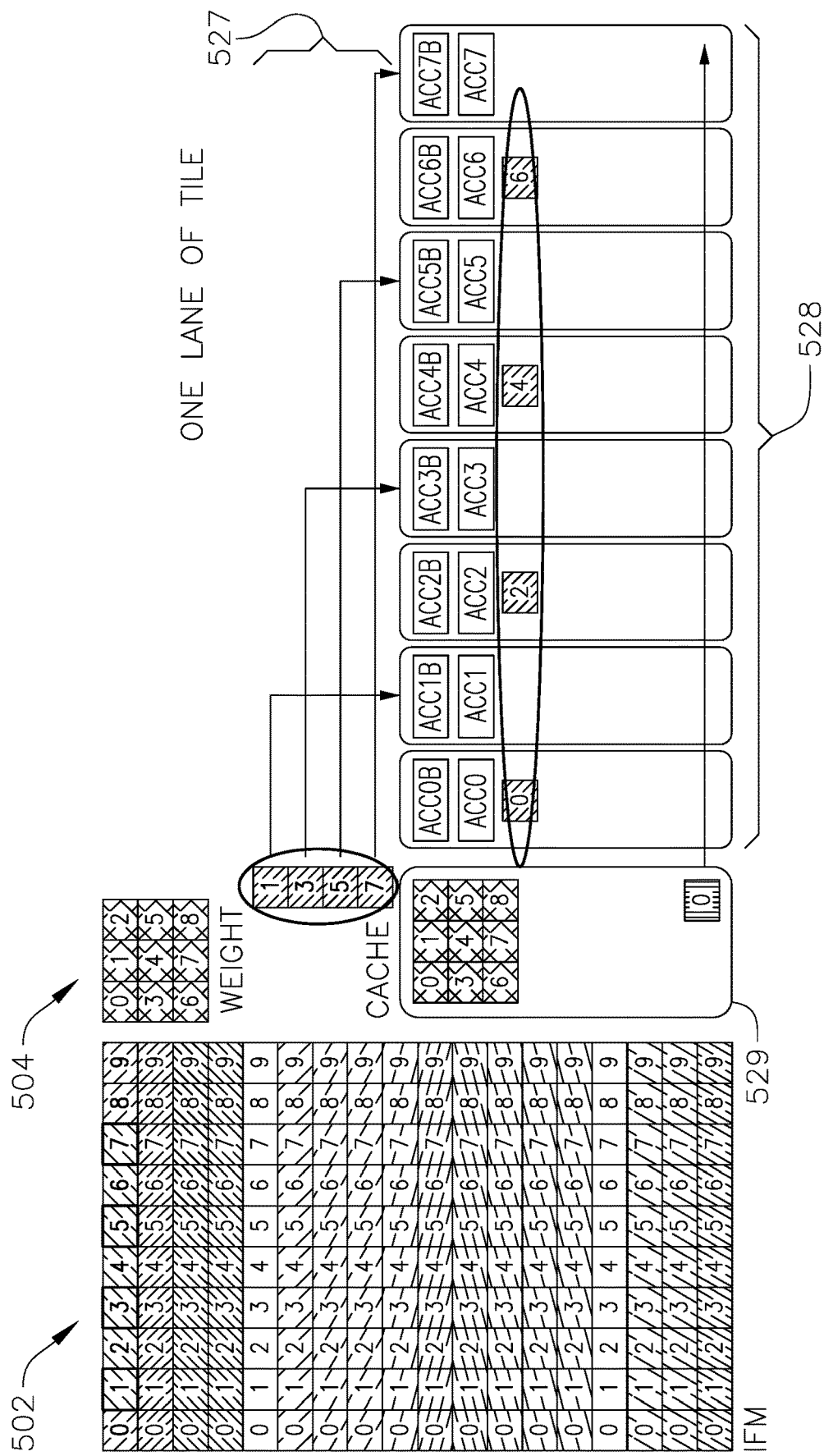
Figure 5D:
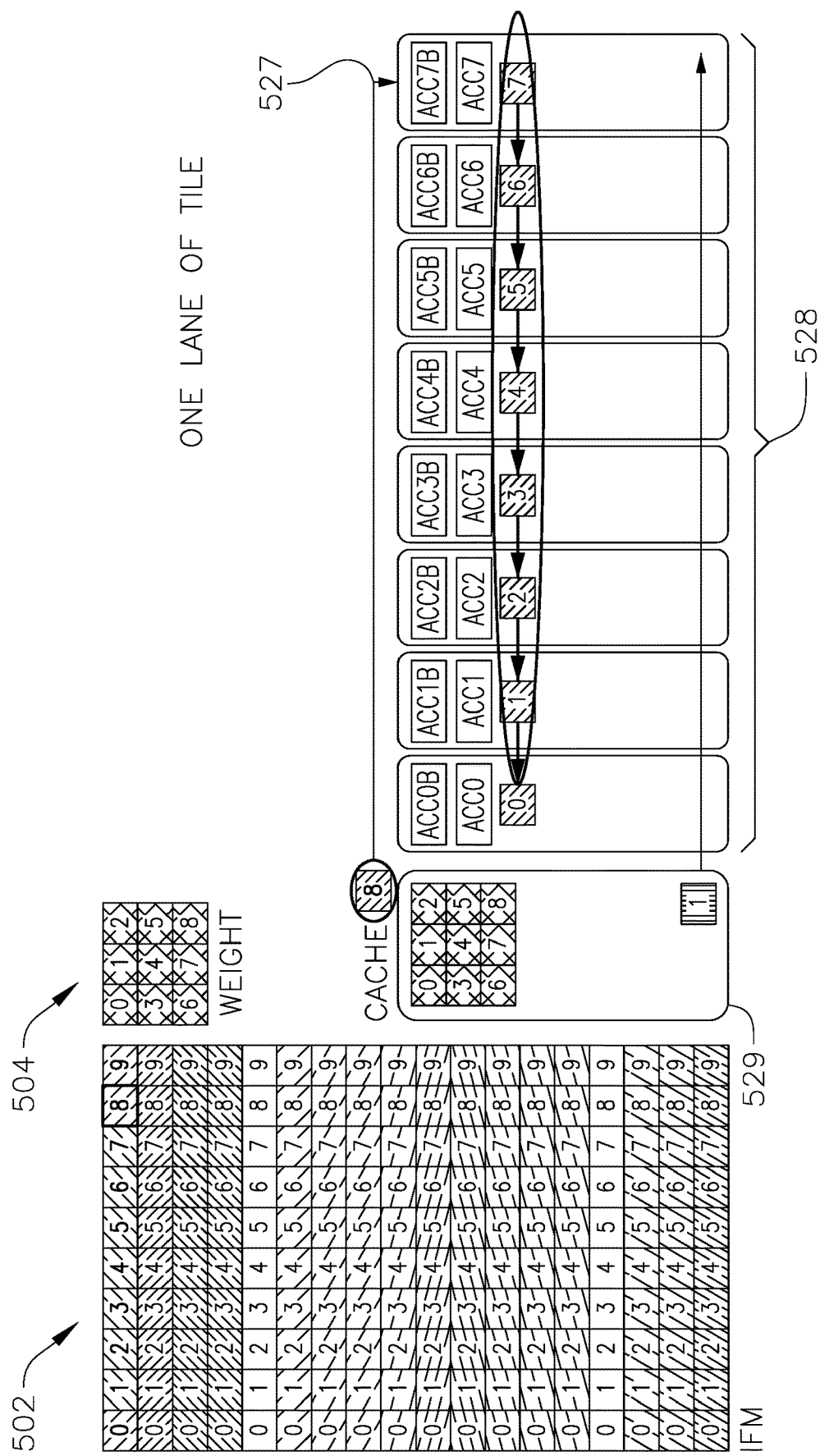
Figure 5E:
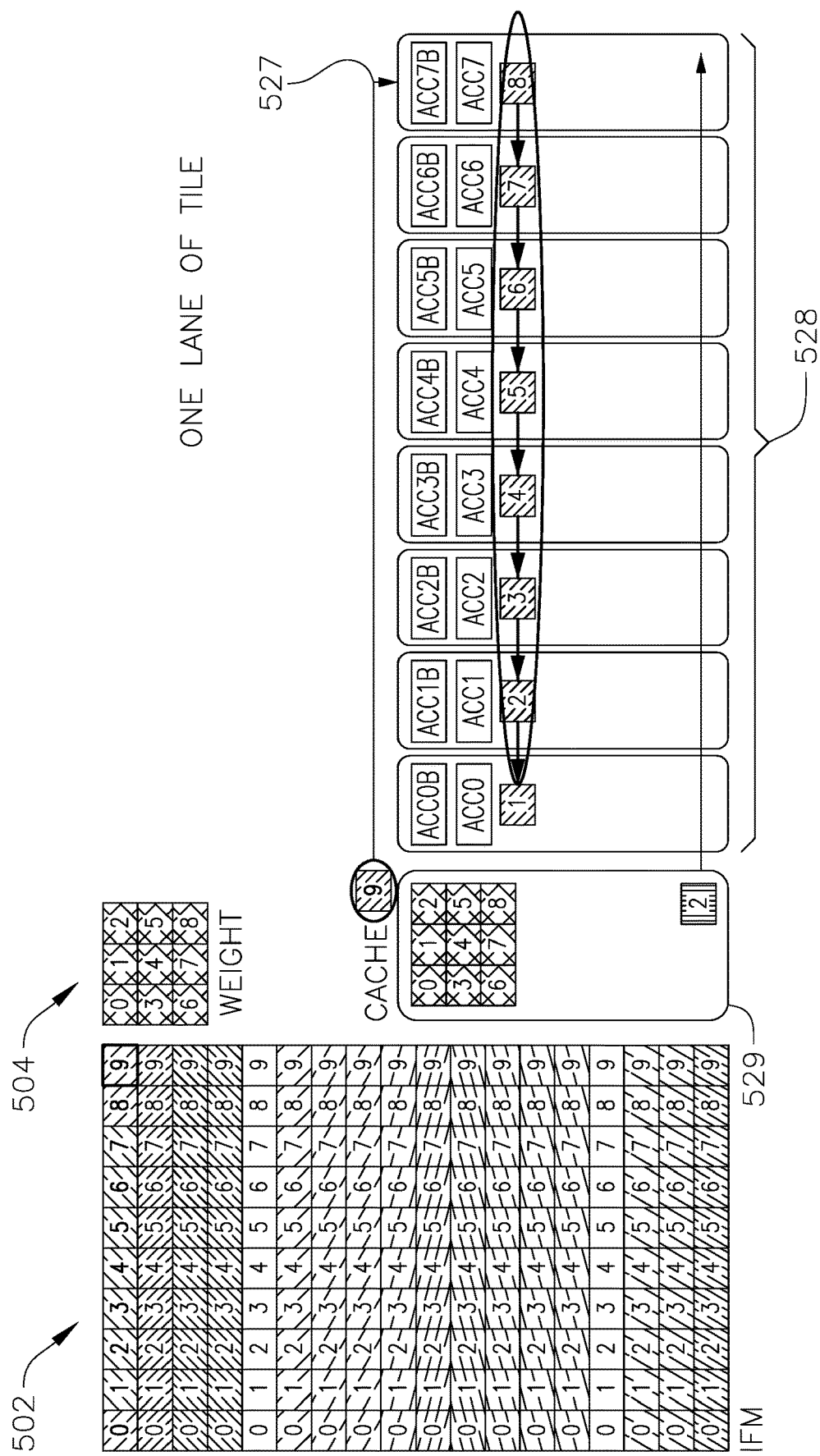
Figure 5F:
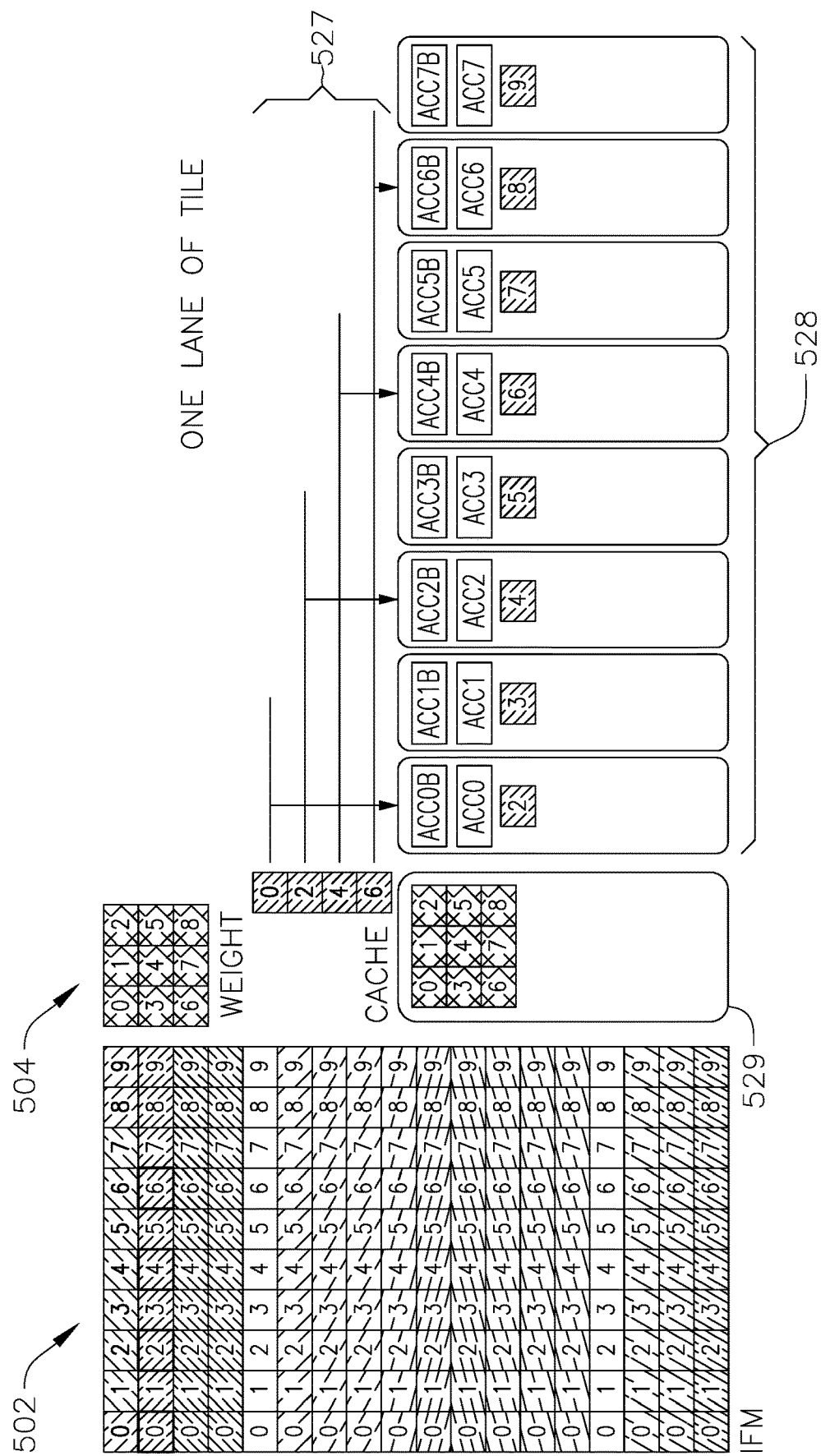
Figure 5G:
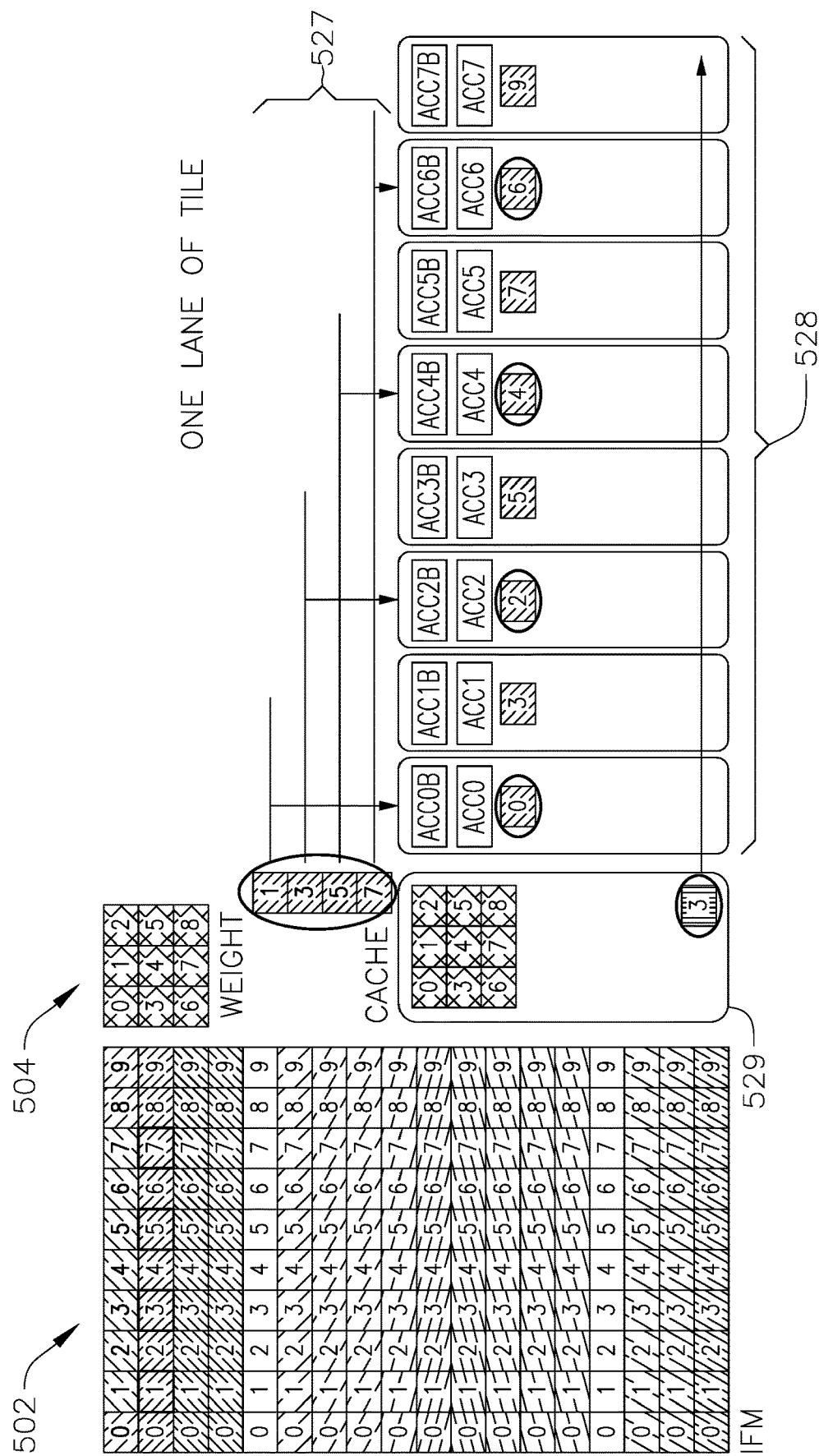
Figure 5H:
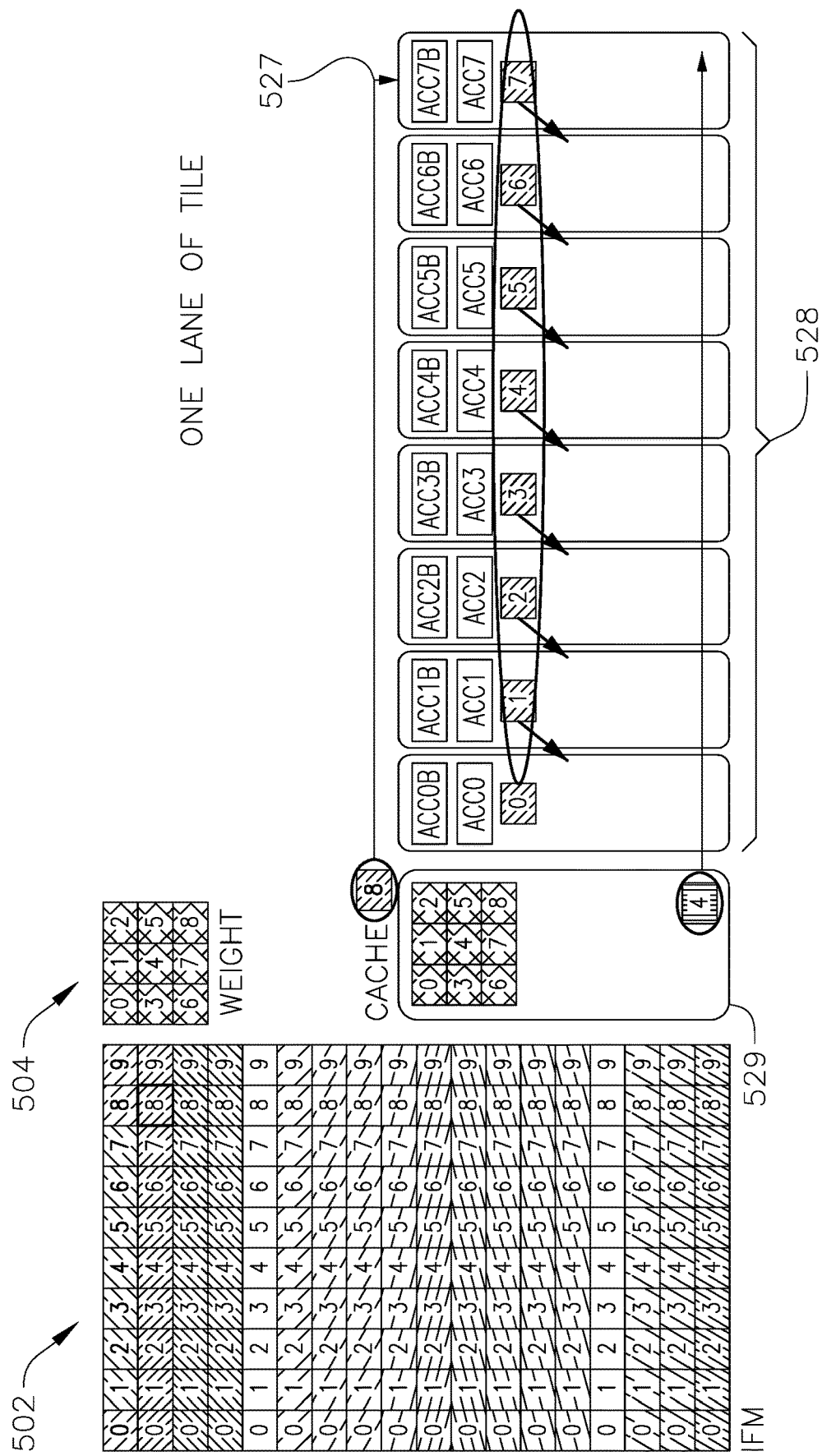
Figure 5I:
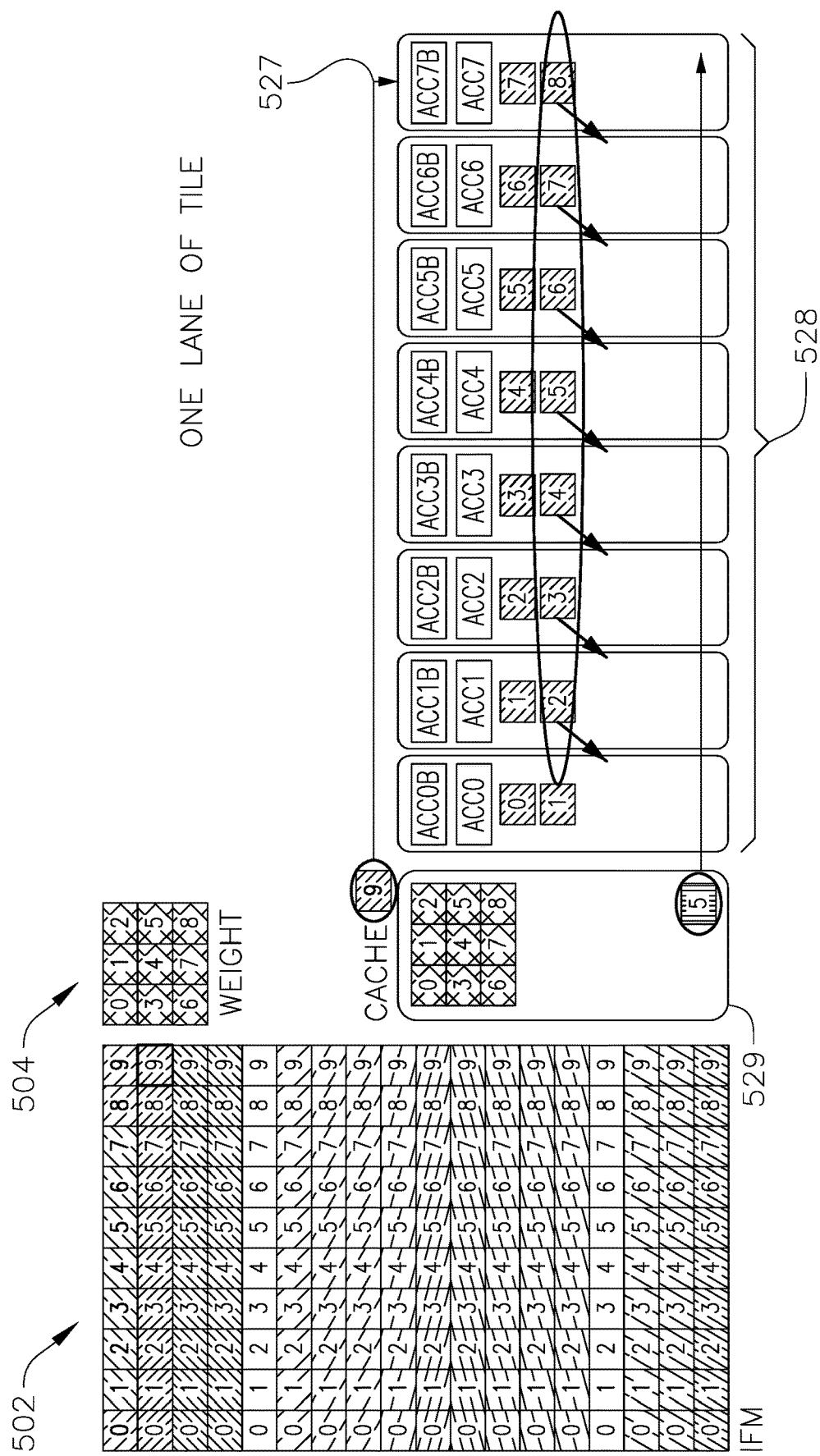
Figure 5J:
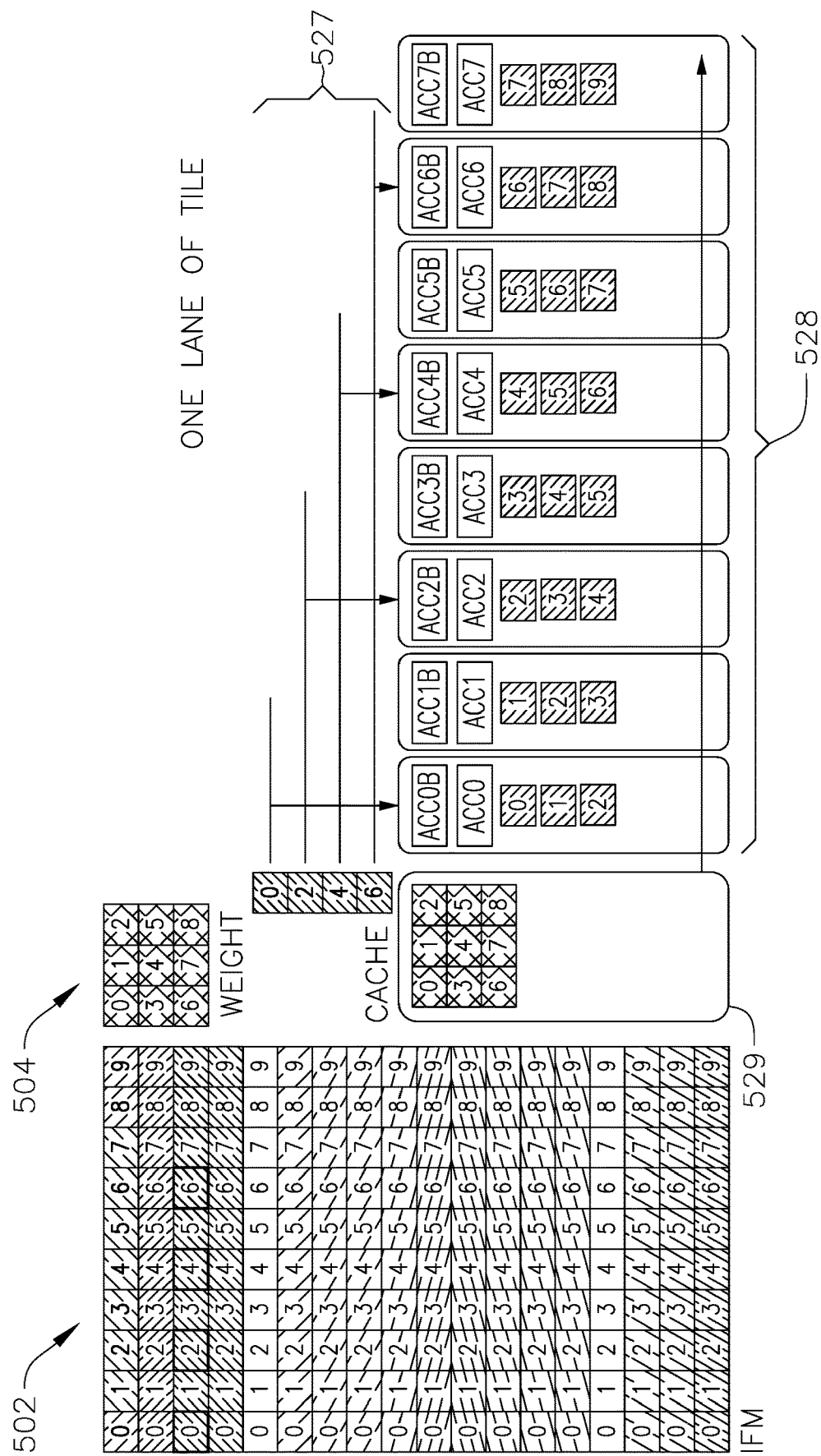
Figure 5K:
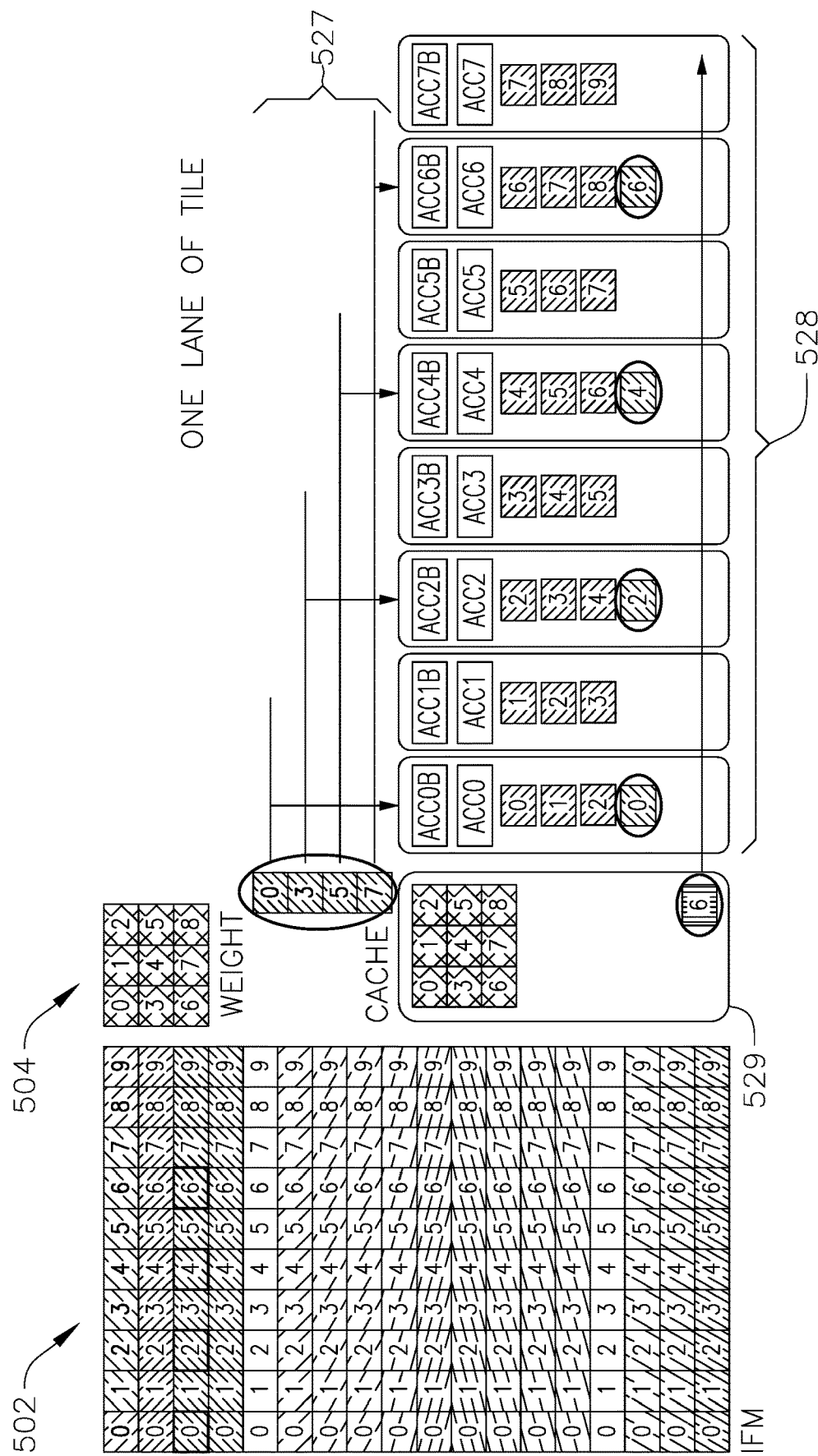
Figure 5L:
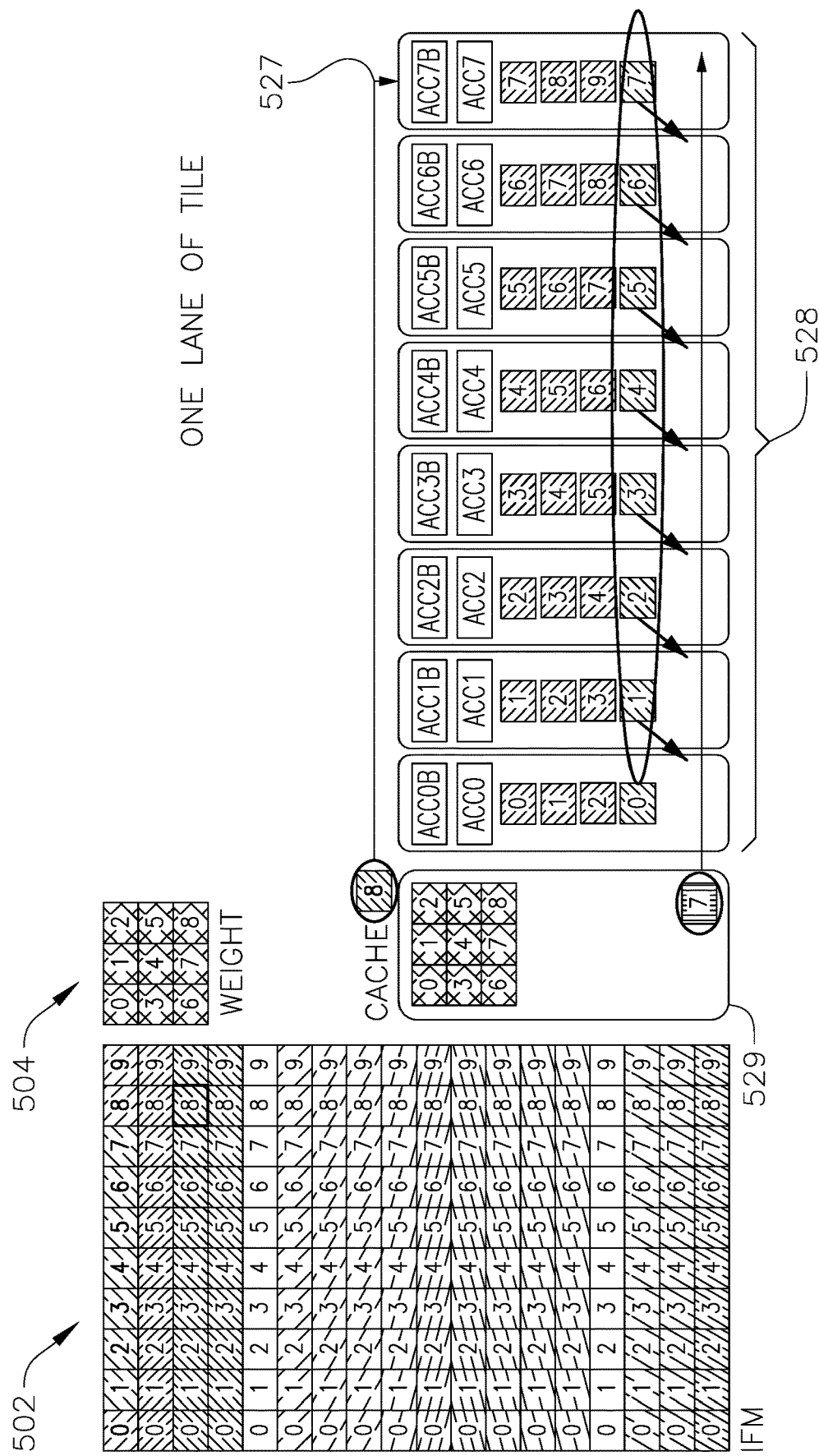
Figure 5M:
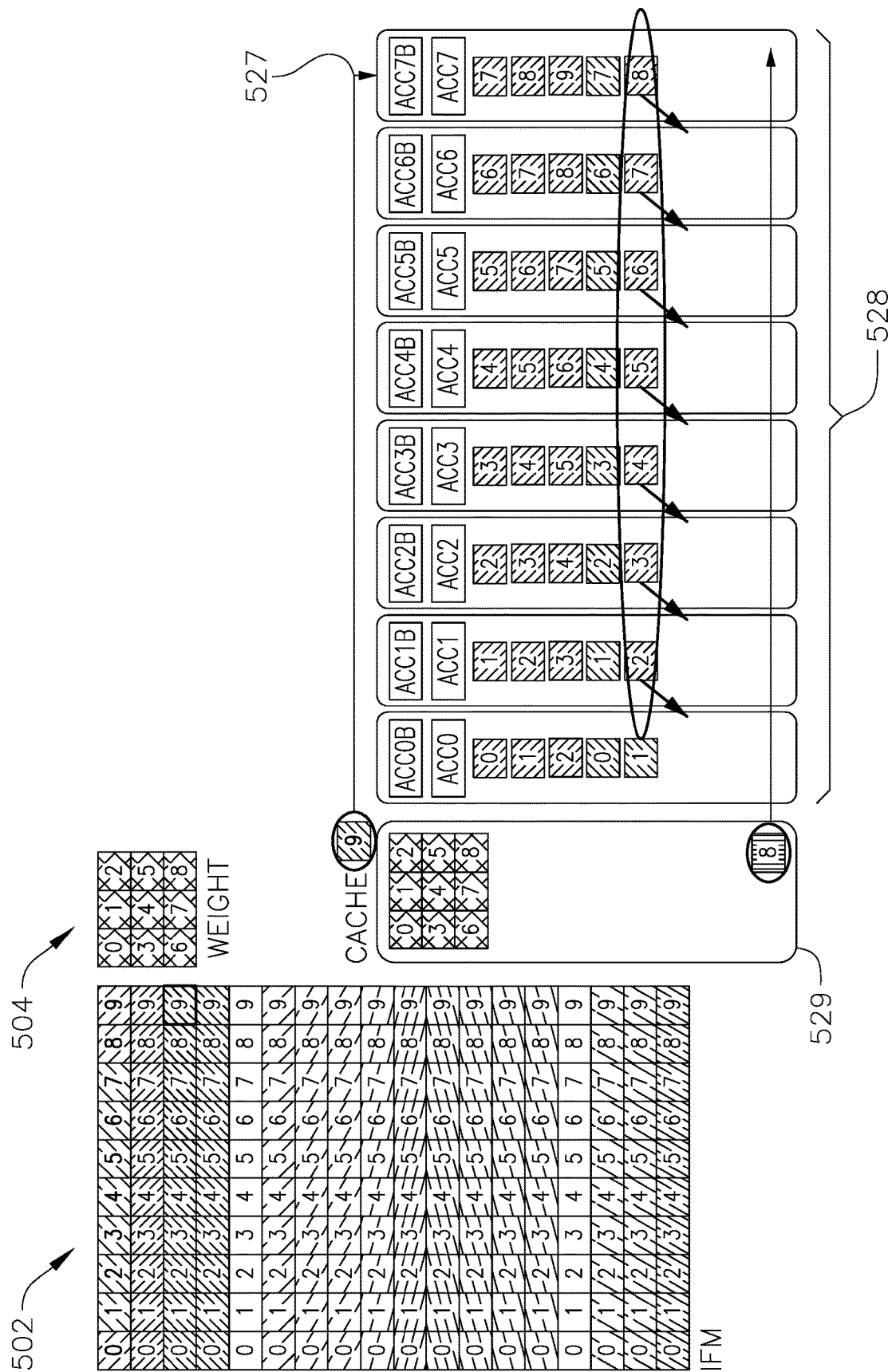
Figure 5N:
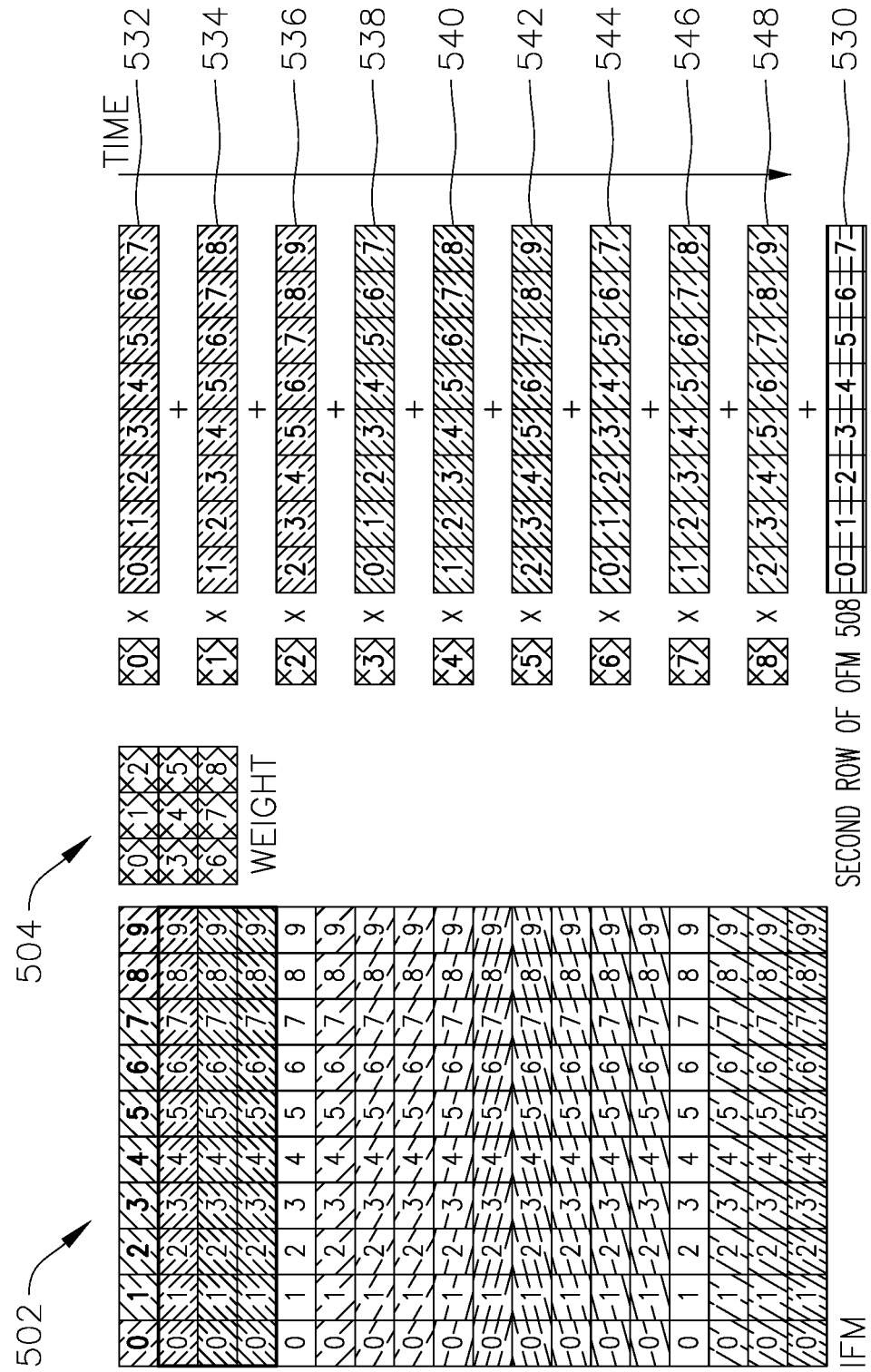
FIGS. 5N-5W illustrate in details regarding the determination of a second row of the OFM, according to some embodiments of the present disclosure.
Figure 5O:
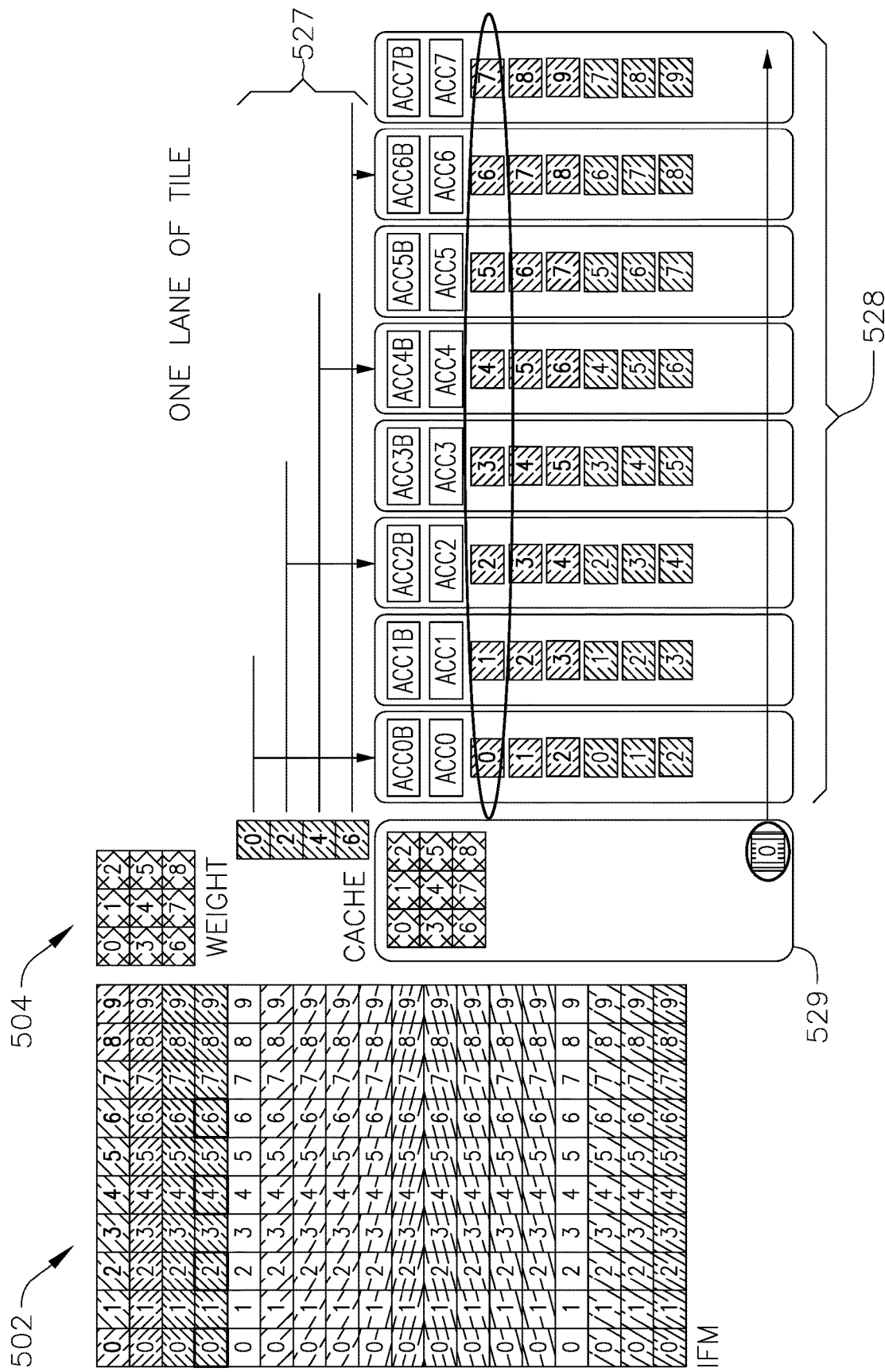
Figure 5P:
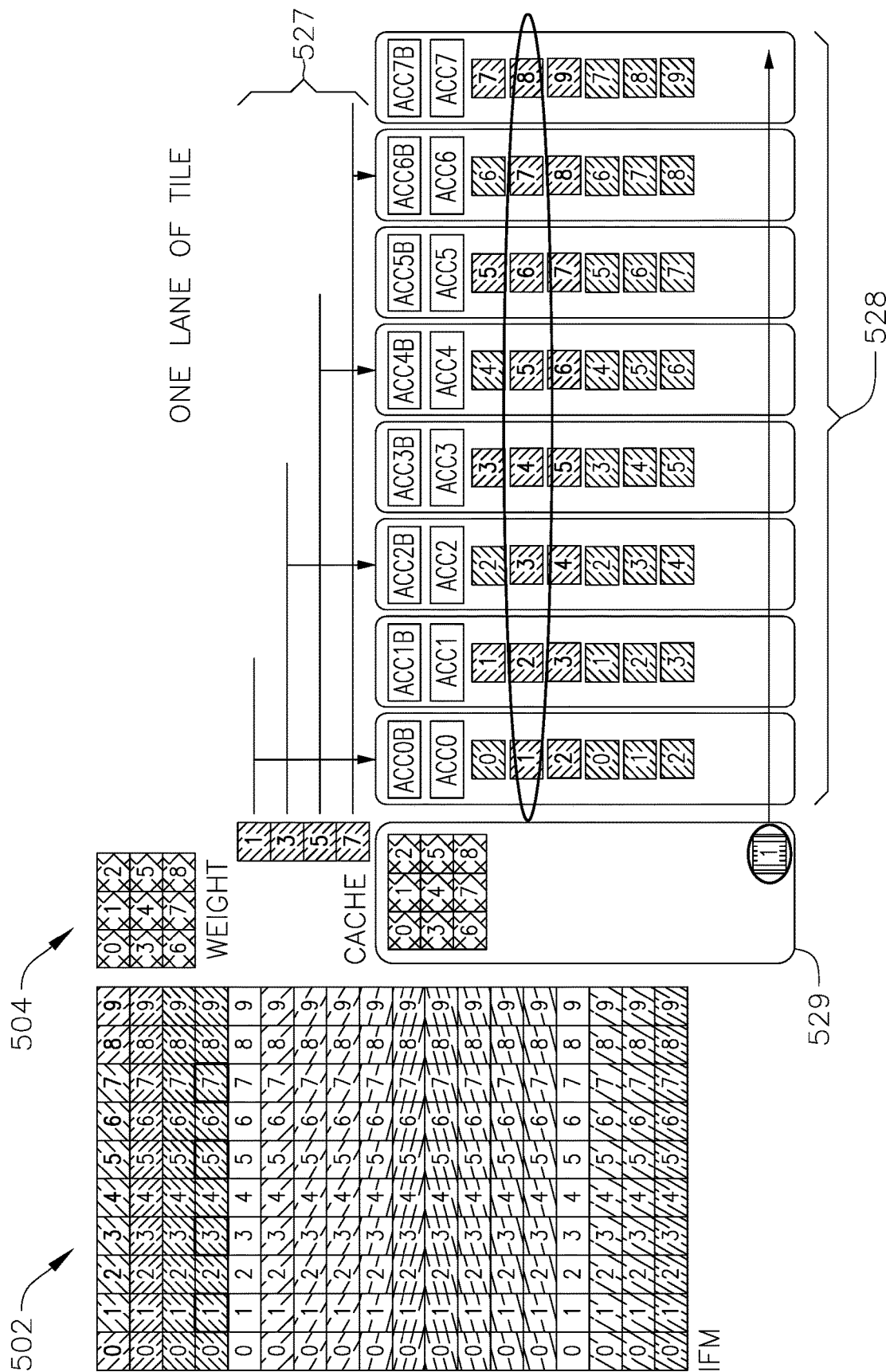
Figure 5Q:
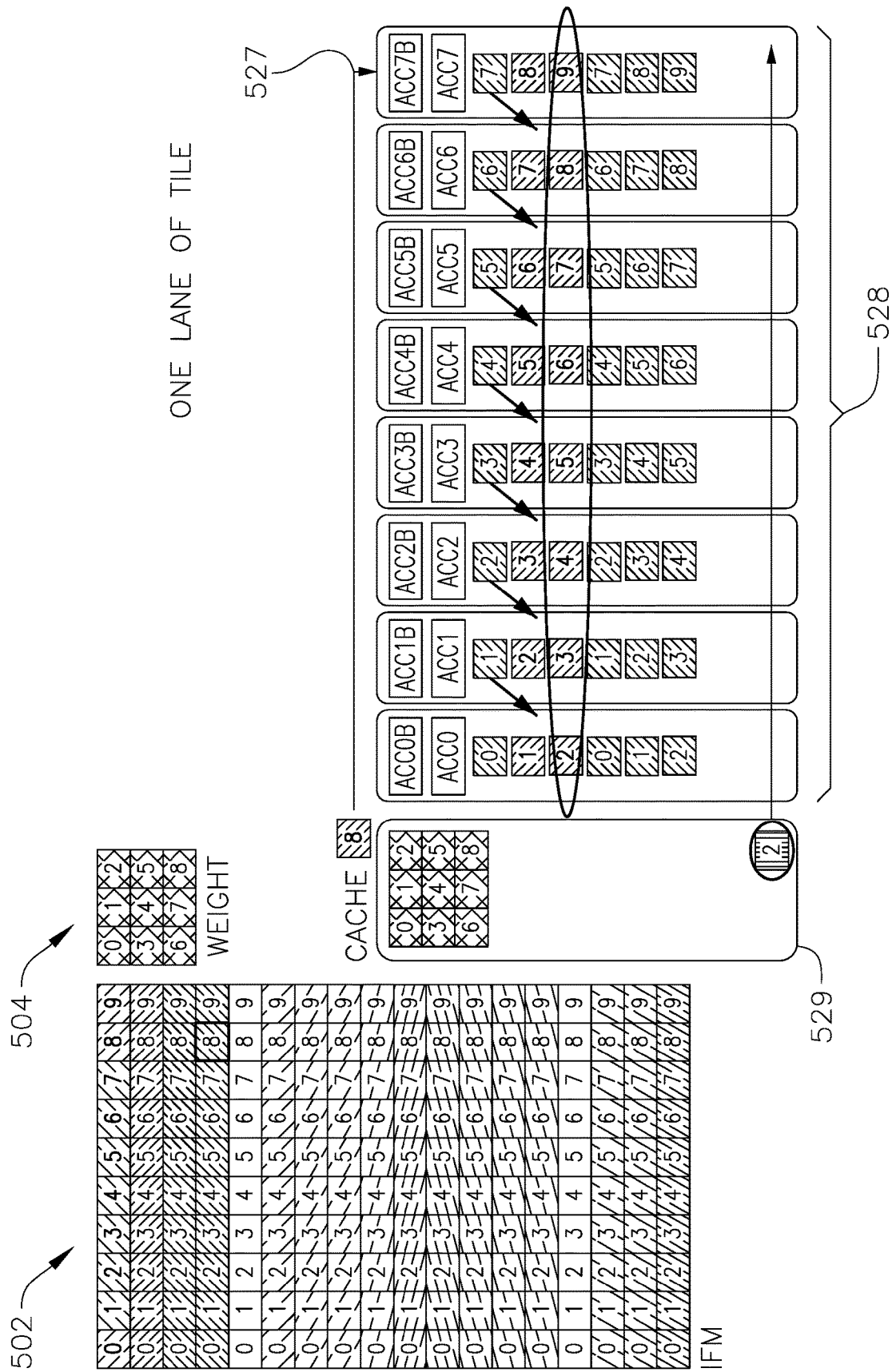
Figure 5R:
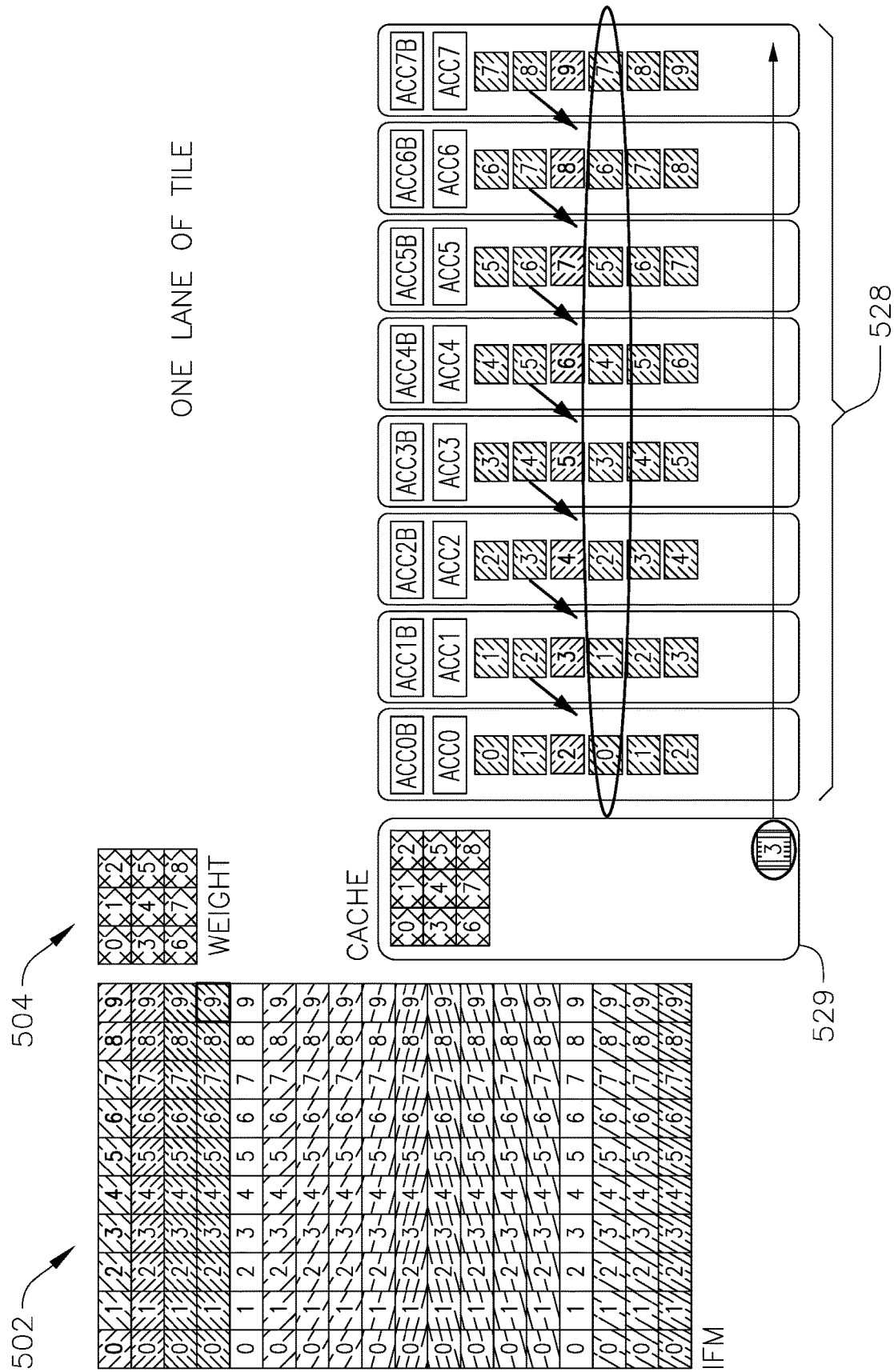
Figure 5S:
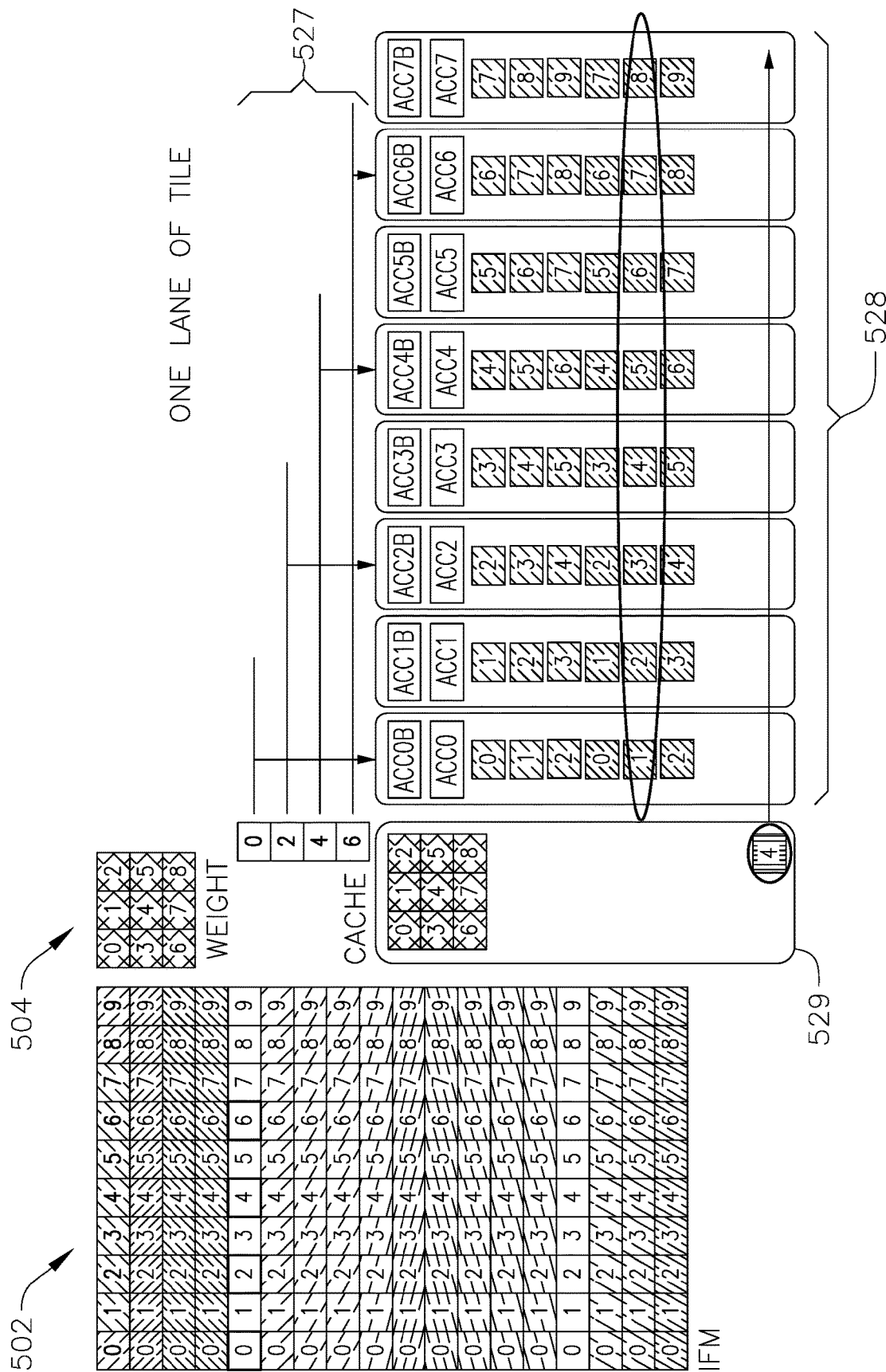
Figure 5T:
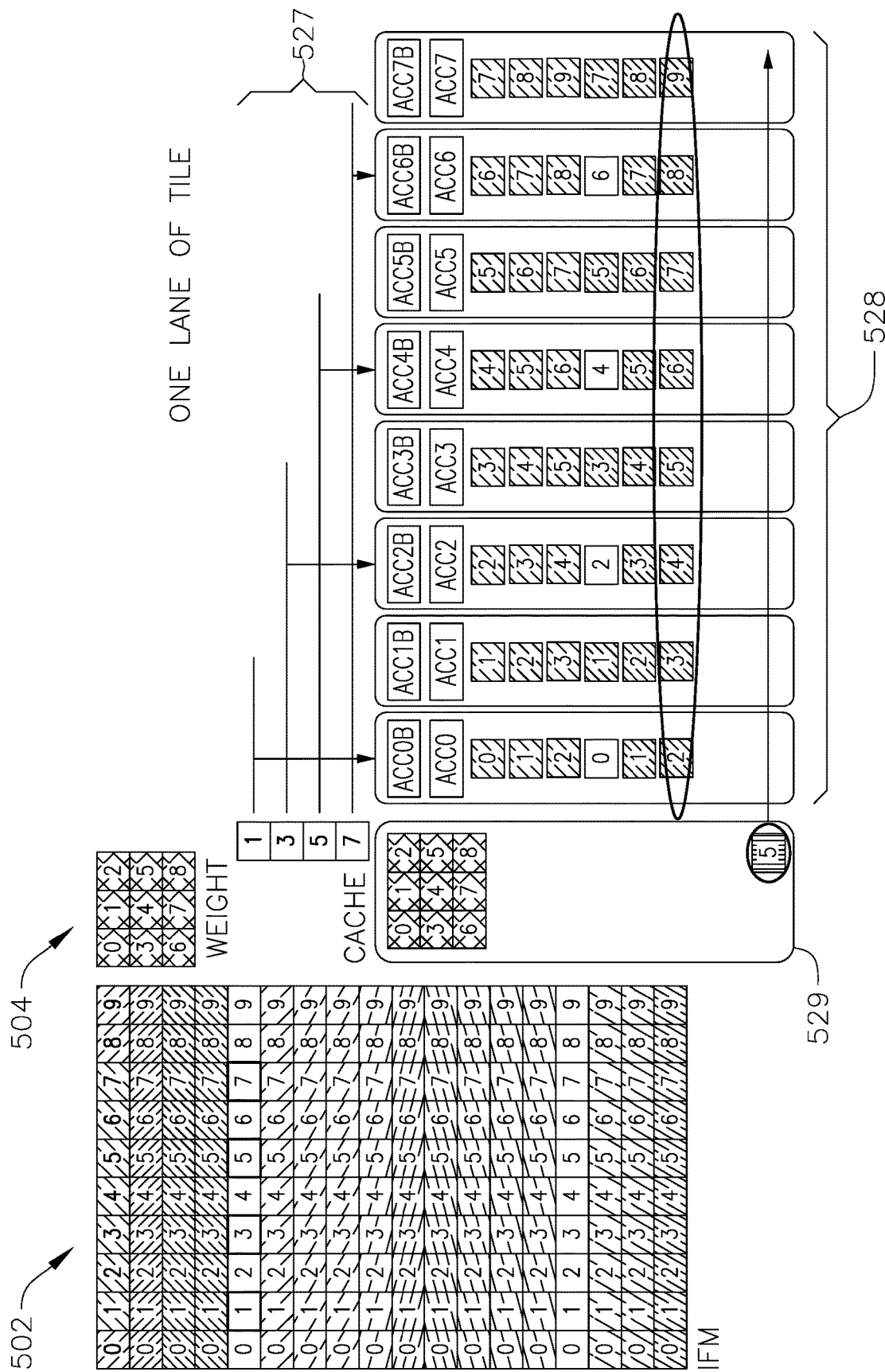
Figure 5U:
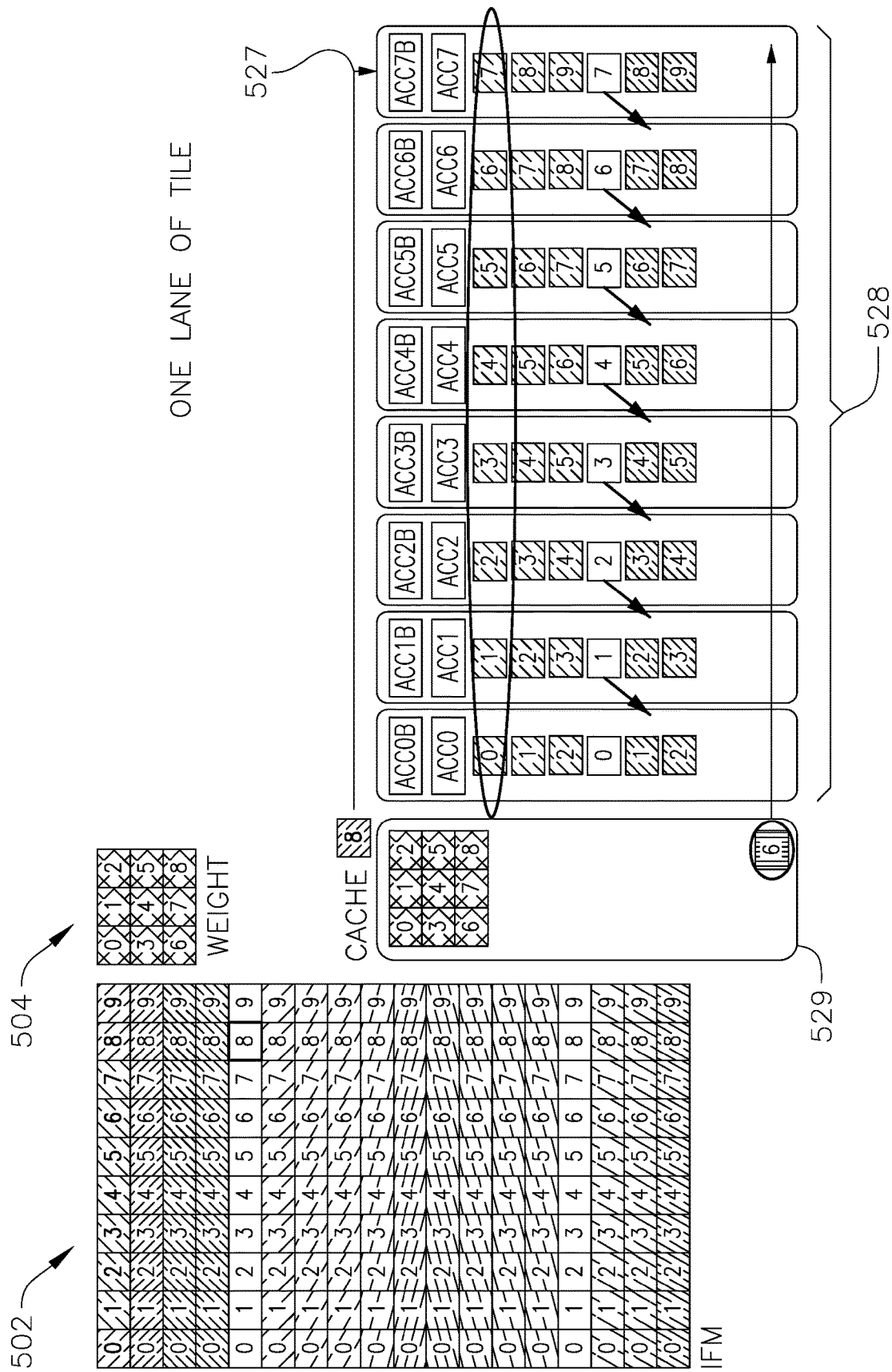
Figure 5V:
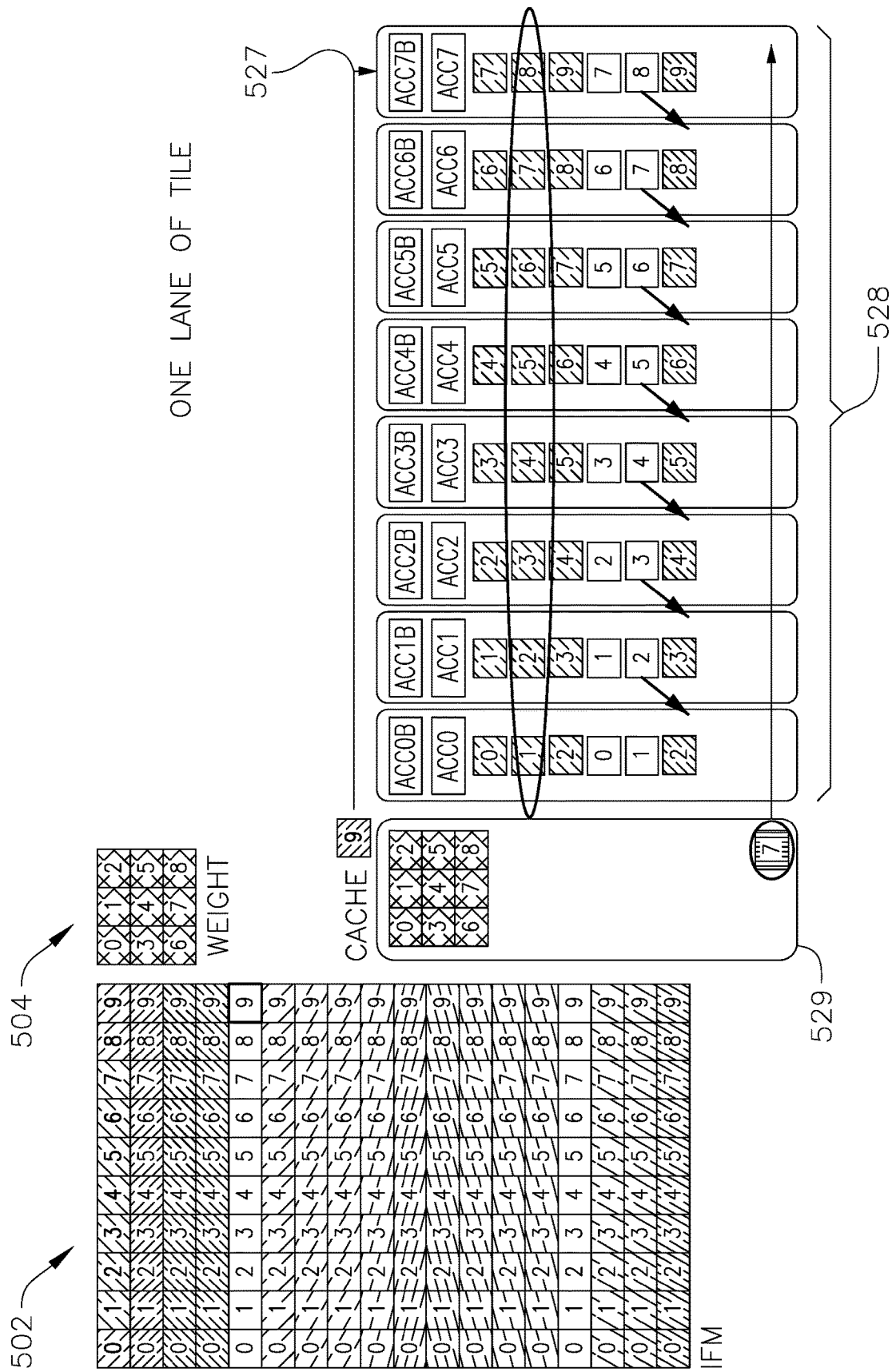
Figure 5W:
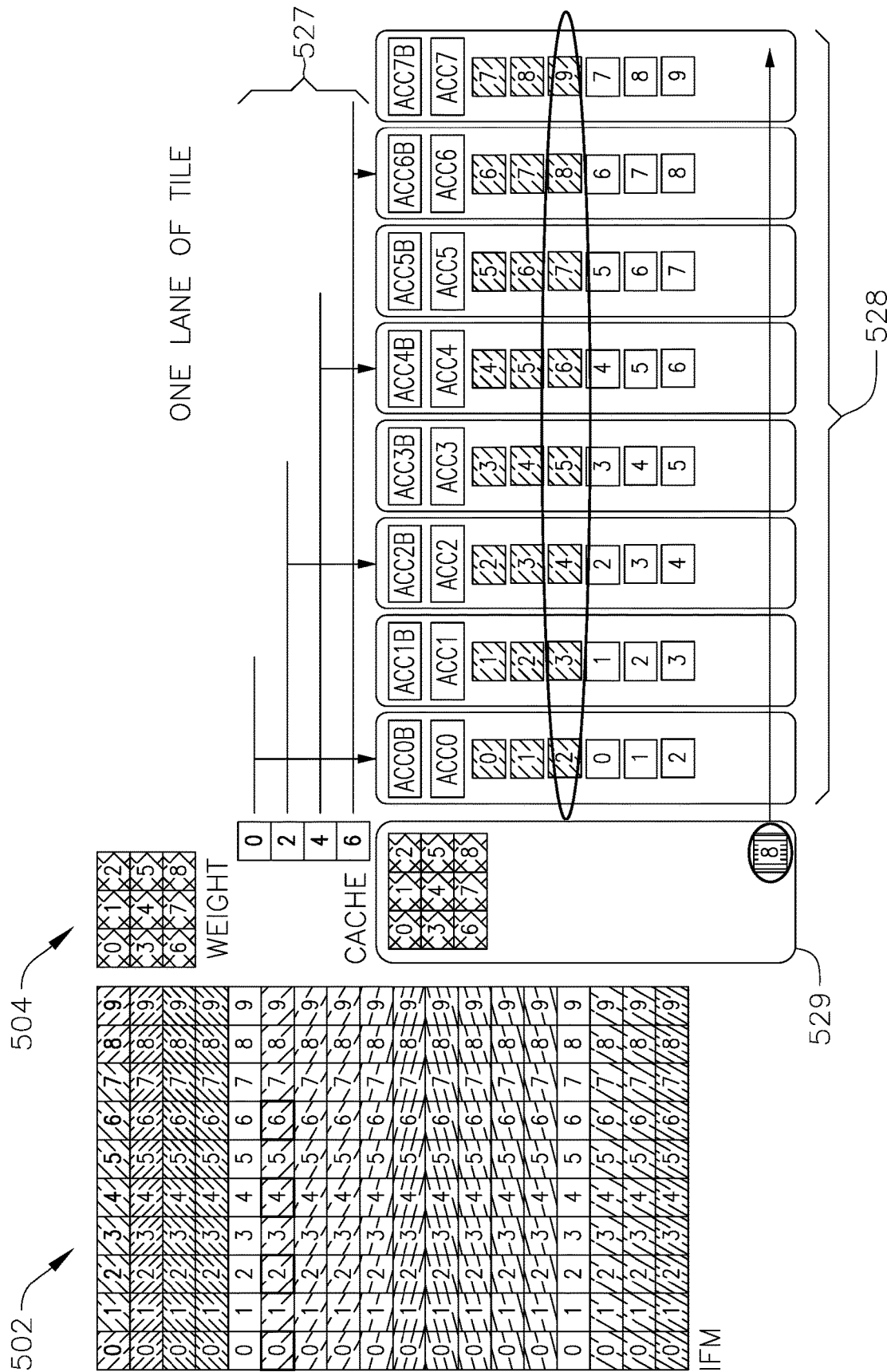

FIGS. 5A-5W illustrate an example method of determining a 2D OFM from a 2D IFM and a 2D kernel of weights.

In the example embodiment of FIGS. 5A-5W, the weights in the kernel 504 may be placed in a cache 529 while the IFM is read into weight registers 528 (e.g., weight buffer 116 of FIGS. 1-2).

FIGS. 5A-5M illustrate in details regarding the determination of a first row 506 of the OFM 508 (e.g., an example for 3*3 convolution with stride one and no padding).

FIG. 5B illustrates the details of the step 510 of FIG. 5A. As shown in FIG. 5B, at 510, the four read channels 527 (e.g., the segmented IFM delivery fabric) load data from the positions [0,0], [0,2], [0,4], and [0,6] of the first row of the IFM 502 matrix from SRAM (e.g., SRAM bank set including four SRAM blocks) into four weight registers from a plurality (e.g., eight) of weight registers 528 (e.g., weight buffer 116 of FIGS. 1-2).

Next, as shown in FIG. 5C the four read channels 527 load data from positions [0,1], [0,3], [0,5], and [0,7] of the first row of the IFM 502 matrix from SRAM into other four weight registers from among the eight weight registers 528. The cache 529 (e.g., a Zigzag cache) broadcasts the weight value W0 at position [0,0] of the kernel 504. The multipliers in each column (e.g., a PE column of a MAC tile) may multiply the IFM values in the IFM matrix 502 positions [0,0]-[0,7] loaded in the weight registers 528 with W0, and load the results into a first set of accumulators (e.g., accumulator register 122 of FIG. 2).

FIG. 5D illustrates the details of the step 512. As shown in FIG. 5D, one read channel loads data from the position [0,8] of the first row of the IFM 502 matrix from SRAM into the weight register 528 for the eighth column of the IFM matrix 502, while the IFM values loaded in the previous cycle (e.g., the IFM values in the IFM matrix 502 positions [0,0]-[0,7]) may be shifted to the left to the adjacent columns of the weight registers 528, as shown in FIG. 5D. The cache 529 broadcasts the weight value W1 at position [0, 1] of the weight matrix 504. The multipliers in each column (e.g., a PE column of a MAC tile) may multiply the IFM values in the IFM matrix 502 positions [0,1]-[0,8] loaded in the weight registers 528 with W1, and the results of the multiplications may be accumulated into the first set of accumulators (e.g., accumulator register 122 of FIG. 2).

FIG. 5E illustrates the details of the step 514. As shown in FIG. 5E, one read channel loads data from the position [0,9] of the first row of the IFM 502 matrix from SRAM into the weight register 528 for the ninth column of the IFM matrix 502, while the IFM values loaded in the previous cycle (e.g., the IFM values in the IFM matrix 502 positions [0,1]-[0,8]) may be shifted to the left to the adjacent columns of the weight registers 528, as shown in FIG. 5E. The cache 529 may broadcast the value W2 at position [0, 2]. The multipliers in each column (e.g., a PE column of a MAC tile) may multiply the IFM values in the IFM 502 matrix position [0,2]-[0,9] loaded in the weight registers with W2, and the results of the multiplications may be accumulated into the first set of accumulators (e.g., accumulator register 122 of FIG. 2). At this stage, the processor has completed the first set of calculations for the convolution to determine the OFM 508. Data from the positions [0,0]-[0,9] of the first row of the IFM 502 matrix may not be used in the next calculations (e.g., may not be needed for the next calculation) and therefore may not be saved in the weight registers 528 (e.g., the data from the first row of the IFM 502 may be discarded from or overwritten in the weight registers 528).

FIGS. 5F-5G illustrate the details of step 516. As shown in FIG. 5F, the four read channels 527 (e.g., the segmented IFM delivery fabric) load data from the positions [1,0], [1,2], [1,4], and [1,6] of the second row of the IFM 502 matrix from SRAM (e.g., SRAM bank set including four SRAM blocks) into four weight registers from a plurality (e.g., eight) of weight registers 528 (e.g., weight buffer 116 of FIGS. 1-2). Next, as shown in FIG. 5G the four read channels 527 load data from positions [1,1], [1,3], [1,5], and [1,7] of the second row of the IFM 502 matrix from SRAM into other four weight registers from among the eight weight registers 528. The cache 529 (e.g., a Zigzag cache) broadcasts the weight value W3 at position [1,0] of the weight matrix (or kernel) 504. The multipliers in each column (e.g., a PE column of a MAC tile) may multiply the IFM values in the IFM matrix 502 positions [1,0]-[1,7] loaded in the weight registers 528 with W3, and load the results into a first set of accumulators (e.g., accumulator register 122 of FIG. 2).

FIG. 5H illustrates the details of the step 518. As shown in FIG. 5H, one read channel loads data from the position [1,8] of the second row of the IFM 502 matrix from SRAM into the weight register 528 for the eighth column of the IFM matrix 502, while the IFM values loaded in the previous cycle (e.g., the IFM values in the IFM matrix 502 positions [1,0]-[1,7]) may be shifted to the left to the adjacent columns of the weight registers 528, as shown in FIG. 5H. The cache 529 broadcasts the weight value W4 at position [1,1] of the weight matrix 504. The multipliers in each column (e.g., a PE column of a MAC tile) may multiply the IFM values in the IFM matrix 502 positions [1,1]-[1,8] loaded in the weight registers 528 with W4, and the results of the multiplications may be accumulated into the first set of accumulators (e.g., accumulator register 122 of FIG. 2).

FIG. 5I illustrates the details of the step 520. As shown in FIG. 5I, one read channel loads data from the position [1,9]

of the second row of the IFM 502 matrix from SRAM into the weight register 528 for the ninth column of the IFM matrix 502, while the IFM values loaded in the previous cycle (e.g., the IFM values in the IFM matrix 502 positions [1,1]-[1,8]) may be shifted to the left to the adjacent columns of the weight registers 528, as shown in FIG. 5I. The cache 529 may broadcast the value W5 at position [1, 2]. The multipliers in each column (e.g., a PE column of a MAC tile) may multiply the IFM values in the IFM 502 matrix position [1,2]-[1,9] loaded in the weight registers with W5, and the results of the multiplications may be accumulated into the first set of accumulators (e.g., accumulator register 122 of FIG. 2). At this stage, the processor has completed the second set of calculations for the convolution to determine the OFM 508. Data from the positions [1,0]-[1,9] of the first row of the IFM 502 matrix may be used in the next calculations and therefore may be saved in the weight registers 528.

FIGS. 5J-5K illustrate the details of step 522. As shown in FIG. 5J, the four read channels 527 (e.g., the segmented IFM delivery fabric) load data from the positions [2,0], [2,2], [2,4], and [2,6] of the second row of the IFM 502 matrix from SRAM (e.g., SRAM bank set including four SRAM blocks) into four weight registers from a plurality (e.g., eight) of weight registers 528 (e.g., weight buffer 116 of FIGS. 1-2). Next, as shown in FIG. 5K the four read channels 527 load data from positions [2,1], [2,3], [2,5], and [2,7] of the third row of the IFM 502 matrix from SRAM into other four weight registers from among the eight weight registers 528. The cache 529 (e.g., a Zigzag cache) broadcasts the weight value W6 at position [2,0] of the weight matrix 504. The multipliers in each column (e.g., a PE column of a MAC tile) may multiply the IFM values in the IFM matrix 502 positions [2,0]-[2,7] loaded in the weight registers 528 with W6, and load the results into a first set of accumulators (e.g., accumulator register 122 of FIG. 2).

FIG. 5L illustrates the details of the step 524. As shown in FIG. 5L, one read channel loads data from the position [2,8] of the third row of the IFM 502 matrix from SRAM into the weight register 528 for the eighth column of the IFM matrix 502, while the IFM values loaded in the previous cycle (e.g., the IFM values in the IFM matrix 502 positions [2,0]-[2,7]) may be shifted to the left to the adjacent columns of the weight registers 528, as shown in FIG. 5L. The cache 529 broadcasts the weight value W7 at position [2, 1] of the weight matrix 504. The multipliers in each column (e.g., a PE column of a MAC tile) may multiply the IFM values in the IFM matrix 502 positions [2,1]-[2,8] loaded in the weight registers 528 with W7, and the results of the multiplications may be accumulated into the first set of accumulators (e.g., accumulator register 122 of FIG. 2).

FIG. 5M illustrates the details of the step 526. As shown in FIG. 5M, one read channel loads data from the position [2,9] of the third row of the IFM 502 matrix from SRAM into the weight register 528 for the ninth column of the IFM matrix 502, while the IFM values loaded in the previous cycle (e.g., the IFM values in the IFM matrix 502 positions [2,1]-[2,8]) may be shifted to the left to the adjacent columns of the weight registers 528, as shown in FIG. 5M. The cache 529 may broadcast the value W8 at position [2, 2]. The multipliers in each column (e.g., a PE column of a MAC tile) may multiply the IFM values in the IFM 502 matrix position [2,2]-[2,9] loaded in the weight registers with W8, and the results of the multiplications may be accumulated into the first set of accumulators (e.g., accumulator register 122 of FIG. 2). At this stage, the processor has completed the next set of calculations for the convolution to determine the OFM 508. Data from the positions [2,0]-[2,9] of the IFM 502 matrix may be used in the next calculations and therefore may be saved in the weight registers 528.

The results from 510 to 526 may be added to determine the first row 506 of the OFM 508.

FIGS. 5N-5W illustrate in details regarding the determination of a second row 530 of the OFM 508.

FIG. 5O illustrates the details of the step 532 of FIG. 5N. As shown in FIG. 5O, at 532, the four read channels 527 (e.g., the segmented IFM delivery fabric) load data from the positions [3,0], [3,2], [3,4], and [3,6] of the fourth row of the IFM 502 matrix from SRAM (e.g., SRAM bank set including four SRAM blocks) into four weight registers from a plurality (e.g., eight) of weight registers 528 (e.g., weight buffer 116 of FIGS. 1-2). The cache 529 may broadcast the value W0 at position [0, 0]. The multipliers in each column (e.g., a PE column of a MAC tile) may multiply the IFM values in the IFM 502 matrix position [1,0]-[1,7] loaded in the weight registers with W0, and the results of the multiplications may be accumulated into a second set of accumulators (e.g., accumulator register 122 of FIG. 2), while first set of accumulators may be written back into SRAM banks (e.g., SRAM bank sets).

FIG. 5P illustrates the details of the step 534. As shown in FIG. 5P, read channels 527 load data from positions [3,1], [3,3], [3,5], and [3,7] of the fourth row of the IFM 502 matrix from SRAM into other four weight registers from among the eight weight registers 528. The cache 529 (e.g., a Zigzag cache) broadcasts the weight value W1 at position [1,1] of the weight matrix 504. The multipliers in each column (e.g., a PE column of a MAC tile) may multiply the IFM values in the IFM matrix 502 positions [1,1]-[1,8] loaded in the weight registers 528 with W1, and load the results into the second set of accumulators (e.g., accumulator register 122 of FIG. 2). The first set of accumulators continue to be written back into SRAM banks (e.g., SRAM bank sets). Data from the IFM matrix 502 position [1,0]-[1, 7] may not be needed and therefore will be replaced by the data in the IFM 502 data position [3,0]-[3,7].

FIG. 5Q illustrates the details of the step 536. As shown in FIG. 5Q, one read channel loads data from the position [3,8] of the IFM 502 matrix from SRAM into the weight register 528 for the eighth column of the IFM matrix 502, while the IFM values loaded in the previous cycle (e.g., the IFM values in the IFM matrix 502 positions [3,0]-[3,7]) may be shifted to the left to the adjacent columns of the weight registers 528, as shown in FIG. 5Q. The cache 529 broadcasts the weight value W2 at position [0, 2] of the weight matrix 504. The multipliers in each column (e.g., a PE column of a MAC tile) may multiply the IFM values in the IFM matrix 502 positions [1,2]-[1,9] loaded in the weight registers 528 with W2, and the results of the multiplications may be accumulated into the second set of accumulators (e.g., accumulator register 122 of FIG. 2). Data from the positions [1,1]-[1,8] of the IFM 502 matrix may not be used in the next calculations and therefore may be replaced by the data in the IFM 502 data position [3,1]-[3,8].

FIG. 5R illustrates the details of step 538. As shown in FIG. 5R, one read channel loads data from the position [3,9] of the forth row of the IFM 502 matrix from SRAM into the weight register 528 for the ninth column of the IFM matrix 502, while the IFM values loaded in the previous cycle (e.g., the IFM values in the IFM matrix 502 positions [3,1]-[3,8]) may be shifted to the left to the adjacent columns of the weight registers 528, as shown in FIG. 5R. The cache 529 may broadcast the value W3 at position [2, 0]. The multipliers in each column (e.g., a PE column of a MAC tile) may multiply the IFM values in the IFM 502 matrix position [2,0]-[2,7] loaded in the weight registers with W3, and the results of the multiplications may be accumulated into the first set of accumulators (e.g., accumulator register 122 of FIG. 2). At this stage, the processor has completed the second set of calculations for the convolution to determine the OFM 508. Data from the positions [1,2]-[1,9] of the IFM 502 matrix may be used in the next calculations and therefore may be saved in the weight registers 528. Data from the positions [1,2]-[1,9] of the second row of the IFM 502 matrix may not be used in the next calculations and therefore will be replaced by the data in the IFM 502 data position [3,2]-[3,9].

FIG. 5S illustrates the details of step 540. As shown in FIG. 5F, the four read channels 527 (e.g., the segmented IFM delivery fabric) load data from the positions [4,0], [4,2], [4,4], and [4,6] of the fifth row of the IFM 502 matrix from SRAM (e.g., SRAM bank set including four SRAM blocks) into four weight registers from a plurality (e.g., eight) of weight registers 528 (e.g., weight buffer 116 of FIGS. 1-2). The cache 529 (e.g., a Zigzag cache) broadcasts the weight value W4 at position [1,1] of the weight matrix 504. The multipliers in each column (e.g., a PE column of a MAC tile) may multiply the IFM values in the IFM matrix 502 positions [2,1]-[2,8] loaded in the weight registers 528 with W4, and load the results into the second set of accumulators (e.g., accumulator register 122 of FIG. 2).

FIG. 5T illustrates the details of the step 542. As shown in FIG. 5T, read channels 527 load data from positions [4,1], [4,3], [4,5], and [4,7] of the fifth row of the IFM 502 matrix from SRAM into other four weight registers from among the eight weight registers 528. The cache 529 (e.g., a Zigzag cache) broadcasts the weight value W5 at position [1,2] of the weight matrix 504. The multipliers in each column (e.g., a PE column of a MAC tile) may multiply the IFM values in the IFM matrix 502 positions [2,2]-[2,9] loaded in the weight registers 528 with W5, and load the results into the second set of accumulators (e.g., accumulator register 122 of FIG. 2). Data from the IFM matrix 502 position [2,0]-[2,7] may not be needed and therefore will be replaced by the data in the IFM 502 data position [4,0]-[4,7].

FIG. 5U illustrates the details of the step 544. As shown in FIG. 5U, one read channel loads data from the position [4,8] of the IFM 502 matrix from SRAM into the weight register 528 for the eighth column of the IFM matrix 502, while the IFM values loaded in the previous cycle (e.g., the IFM values in the IFM matrix 502 positions [4,0]-[4,7]) may be shifted to the left to the adjacent columns of the weight registers 528, as shown in FIG. 5U. The cache 529 broadcasts the weight value W6 at position [2, 0] of the weight matrix 504. The multipliers in each column (e.g., a PE column of a MAC tile) may multiply the IFM values in the IFM matrix 502 positions [3,0]-[3,7] loaded in the weight registers 528 with W6, and the results of the multiplications may be accumulated into the second set of accumulators (e.g., accumulator register 122 of FIG. 2). Data from the positions [2,1]-[2,8] of the IFM 502 matrix may not be used in the next calculations and therefore will be replaced by the data in the IFM 502 data position [3,1]-[3,8].

FIG. 5V illustrates the details of the step 546. As shown in FIG. 5V, one read channel loads data from the position [4,9] of the fifth row of the IFM 502 matrix from SRAM into the weight register 528 for the ninth column of the IFM matrix 502, while the IFM values loaded in the previous cycle (e.g., the IFM values in the IFM matrix 502 positions [4,1]-[4,8]) may be shifted to the left to the adjacent columns of the weight registers 528, as shown in FIG. 5V. The cache 529 may broadcast the value W7 at position [2, 1]. The multipliers in each column (e.g., a PE column of a MAC tile) may multiply the IFM values in the IFM 502 matrix position [3,1]-[3,8] loaded in the weight registers with W7, and the results of the multiplications may be accumulated into the first set of accumulators (e.g., accumulator register 122 of FIG. 2). At this stage, the processor has completed the next set of calculations for the convolution to determine the OFM 508. Data from the position [3,0]-[3,9] of the IFM matrix 502 will be used in the next calculations and may be saved as shown in FIG. 5V. Data from the positions [2,2]-[2,9] may not be used in the next calculations and therefore will be replaced by the data in the IFM 502 data position [3,2]-[3,9].

FIG. 5W illustrates the details of the step 548 of FIG. 5N. As shown in FIG. 5W, at 548, the four read channels 527 (e.g., the segmented IFM delivery fabric) load data from the positions [5,0], [5,2], [5,4], and [5,6] of the IFM 502 matrix from SRAM (e.g., SRAM bank set including four SRAM blocks) into four weight registers from a plurality (e.g., eight) of weight registers 528 (e.g., weight buffer 116 of FIGS. 1-2). The cache 529 may broadcast the value W8 at position [2, 2]. The multipliers in each column (e.g., a PE column of a MAC tile) may multiply the IFM values in the IFM 502 matrix position [3,2]-[3,9] loaded in the weight registers with W8, and the results of the multiplications may be accumulated into a second set of accumulators (e.g., accumulator register 122 of FIG. 2), and the second set of accumulators may be written back into SRAM banks. (e.g., SRAM bank sets) during the next cycle. In some embodiments, the first set of accumulators may be used to accumulate the multiplications results starting the next cycle.

The results from 532 to 548 may be added to determine the second row 530 of the OFM 508. While the computation of the second row 530 is described above in reference to FIGS. 5N-5W, one of skill in the art would understand that the remaining rows of the OFM 508 can be computed based on the data in the remaining rows of the IFM 502 using substantially similar operations. Similarly, portions of the OFM 508 corresponding to the remaining eight column wide sections (e.g., the second eight column wide section 404) of the IFM 502 can be computed using similar operations, starting with computing the first row of the OFM 508 as described above in reference to FIGS. 5A-5M, and computing the remaining rows of the OFM 508 as described above in reference to FIGS. 5N-5W.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the scope of the present disclosure.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the present disclosure. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the present disclosure refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

In some embodiments, one or more outputs of the different embodiments of the methods and systems of the present disclosure may be transmitted to an electronics device coupled to or having a display device for displaying the one or more outputs or information regarding the one or more outputs of the different embodiments of the methods and systems of the present disclosure.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present disclosure.

Although exemplary embodiments of system and method for accelerating two dimensional (2D) convolutional layer mapping on a dot product architecture have been specifically described and illustrated herein, many modifications and variations will be apparent to those skilled in the art. Accordingly, it is to be understood that a system and method for accelerating two dimensional (2D) convolutional layer mapping on a dot product architecture according to principles of this disclosure may be embodied other than as specifically described herein. The present disclosure is also defined in the following claims, and equivalents thereof.

What is claimed is:

1. A method for performing a two dimensional (2D) convolution operation, the method comprising:
   storing, by a processor, a convolution kernel in a first storage device of the processor, the convolution kernel having dimensions x by y, wherein x is a number of rows in the convolution kernel and y is a number of columns in the convolution kernel;
   storing, by the processor, in a second storage device of the processor, a first subset of element values of an input feature map having dimensions n by m, wherein n is a number of rows in the input feature map and m is a number of columns in the input feature map;
   performing a first simultaneous multiplication, by the processor, of each value of the first subset of element values of the input feature map with a first element value from among the x*y elements of the convolution kernel;
   shifting, by the processor, the first subset of element values one register to the left in a plurality of registers of the second storage device;
   based on the shifting, performing a second simultaneous multiplication, by the processor, of each value of a second subset of element values of the input feature map with a second element value from among the x*y elements of the convolution kernel, wherein the first subset of element values of the input feature map comprises values in first to p-th column of a first row of the input feature map, and the second subset of element values of the input feature map comprises values in second to (p+1)-th column of the first row of the input feature map, and wherein the second subset of element values of the input feature map further comprises at least one element value from the first subset of element values of the input feature map;

for each remaining value of the x*y elements of the convolution kernel, shifting, by the processor, the second subset of element values of the input feature map one register to the left in the plurality of registers of the second storage device, wherein the second subset of element values of the input feature map is then stored to the second storage device;

performing, by the processor, a simultaneous multiplication of the each remaining value with a corresponding subset of element values of the input feature map;

for each simultaneous multiplication, storing, by the processor, a result of the each simultaneous multiplication in at least one accumulator connected to the processor; and outputting, by the processor, an output from the at least one accumulator as a first row of an output feature map (OFM), the first element value from among the x*y elements of the convolution kernel in the first simultaneous multiplication being different from the second element value from among the x*y elements of the convolution kernel in the second simultaneous multiplication, wherein the at least one accumulator comprises a first accumulator configured to add the result of the each simultaneous multiplication to an input value, and a second accumulator coupled to an output of the first accumulator and configured to add the result of the each simultaneous multiplication to an input value and output the first row of the OFM.

2. The method of claim 1, wherein outputting the values of the at least one accumulator as the first row of the OFM comprises adding, by the processor, results of the plurality of simultaneous multiplications stored in the at least one accumulator to generate the first row of the OFM.

3. The method of claim 1, wherein the first storage device comprises a cache memory connected to the processor, and wherein the second storage device comprises the plurality of registers located in a processing element (PE) of a multiply-accumulate (MAC) tile of the processor, wherein the plurality of registers are 9-bit registers.

4. The method of claim 1, further comprising:
broadcasting, by the processor, the first element value from among x*y elements of the convolution kernel to the second storage device; and
broadcasting, by the processor, the second element value from among the x*y elements of the convolution kernel to the second storage device.

5. The method of claim 1, wherein the convolution kernel having the dimension x by y is a weight matrix, the weight matrix comprising a plurality of weight values, the plurality of weight values of the weight matrix are being stored in a cache memory connected to the processor, and wherein the input feature map having the dimension n by m comprises a plurality of activation values.

6. The method of claim 5, wherein the processor comprises a plurality of multiply-accumulate (MAC) tiles, each MAC tile comprising an array of processing element (PE) comprising a plurality of PE rows and a plurality of PE columns, each PE column of the plurality of PE columns comprising a plurality of PEs and an adder tree.

7. The method of claim 6, wherein each MAC tile further comprises cache memory comprising a plurality of parallel activation lanes, each activation lane corresponding to a row of the array of PEs in the each MAC tile.

8. The method of claim 6, wherein each PE of the plurality of PEs comprises the plurality of registers configured to store the plurality of activation values of the input feature map, a multiplier connected to the plurality of registers and configured to multiply activations from the input feature map by the weight values from the cache memory, and a PE accumulator connected to the multiplier and configured to add an output from the multiplier to a value from the plurality of registers and store the result in the plurality of registers.

9. The method of claim 6, wherein the array of PEs in the each MAC tile comprises eight PE columns, wherein each PE column of the eight PE columns of the each MAC tile comprises sixteen PEs.

10. A system for performing a two dimensional (2D) convolution operation, the system comprising:
a memory and a processor in communication with the memory, wherein the processor is configured to:
store, in a first storage device of the processor, a convolution kernel having dimensions x by y, wherein x is a number of rows in the convolution kernel and y is a number of columns in the convolution kernel;
store, in a second storage device connected to the processor, a first subset of element values of an input feature map having dimensions n by m, wherein n is a number of rows in the input feature map and m is a number of columns in the input feature map;
perform a first simultaneous multiplication of each value of the first subset of element values of the input feature map with a first element value from among the x*y elements of the convolution kernel;
shift the first subset of element values one register to the left in a plurality of registers of the second storage device;
based on the shift, perform a second simultaneous multiplication of each value of a second subset of element values of the input feature map with a second element value from among the x*y elements of the convolution kernel, wherein the first subset of element values of the input feature map comprises values in first to p-th column of a first row of the input feature map, and the second subset of element values of the input feature map comprises values in second to (p+1)-th column of the first row of the input feature map, and wherein the second subset of element values of the input feature map further comprises at least one element value from the first subset of element values of the input feature map;
for each remaining value of the x*y elements of the convolution kernel, shift the second subset of element values of the input feature map one register to the left in the plurality of registers of the second storage device, wherein the second subset of element values of the input feature map is then stored to the second storage device;
perform a simultaneous multiplication of the each remaining value with a corresponding subset of element values of the input feature map;

for each simultaneous multiplication, store a result of the each simultaneous multiplication in at least one accumulator connected to the processor; and output an output from the at least one accumulator as a first row of an output feature map (OFM), the first element value from among the x*y elements of the convolution kernel in the first simultaneous multiplication being different from the second element value from among the x*y elements of the convolution kernel in the second simultaneous multiplication, wherein the at least one accumulator comprises a first accumulator configured to add the result of the each simultaneous multiplication to an input value, and a second accumulator coupled to an output of the first accumulator and configured to add the result of the each simultaneous multiplication to an input value and output the first row of the OFM.

11. The system of claim 10, wherein the processor is further configured to output the values of the at least one accumulator as the first row of the OFM by adding results of the plurality of simultaneous multiplications stored in the at least one accumulator to generate the first row of the OFM.

12. The system of claim 10, wherein the first storage device comprises a cache memory connected to the processor, and wherein the second storage device comprises the plurality of registers located in a processing element (PE) of a multiply-accumulate (MAC) tile of the processor, wherein the plurality of registers are 9-bit registers.

13. The system of claim 10, wherein the processor is further configured to:
broadcast the first element value from among x*y elements of the convolution kernel to the second storage device; and
broadcast the second element value from among the x*y elements of the convolution kernel to the second storage device.

14. The system of claim 10, wherein the convolution kernel having the dimension x by y is a weight matrix, the weight matrix comprising a plurality of weight values, the plurality of weight values of the weight matrix are being stored in a cache memory connected to the processor, and wherein the input feature map having the dimension n by m comprises a plurality of activation values, wherein the processor comprises a plurality of multiply-accumulate (MAC) tiles, each MAC tile comprising an array of processing element (PE) comprising a plurality of PE rows and a plurality of PE columns, each PE column of the plurality of PE columns comprising a plurality of PEs and an adder tree.

15. The system of claim 14, wherein each MAC tile further comprises cache memory comprising a plurality of parallel activation lanes, each activation lane corresponding to a row of the array of PEs in the each MAC tile, wherein the array of PEs in the each MAC tile comprises eight PE columns, wherein each PE column of the eight PE columns of the each MAC tile comprises sixteen PEs.

16. The system of claim 14, wherein each PE of the plurality of PEs comprises the plurality of registers configured to store the plurality of activation values of the input feature map, a multiplier connected to the plurality of registers and configured to multiply activations from the input feature map by the weight values from the cache memory, and a PE accumulator connected to the multiplier and configured to add an output from the multiplier to a value from the plurality of registers and store the result in the plurality of registers.

17. A method comprising:
performing a first simultaneous multiplication, by a processor, of each value of a first subset of element values of a first matrix with a first element value from among x*y elements of a second matrix;
shifting, by the processor, the first subset of element values one register to the left in a plurality of registers of a first storage device;
based on the shifting, performing a second simultaneous multiplication, by the processor, of each value of a second subset of element values of the first matrix with a second element value from among the x*y elements of the second matrix, wherein the first subset of element values of the first matrix comprises values in first to p-th column of a first row of the first matrix, and the second subset of element values of the first matrix comprises values in second to (p+1)-th column of the first row of the first matrix, and wherein the second subset of element values of the first matrix further comprises at least one element value from the first subset of element values of the first matrix;
for each remaining value of the x*y elements of the second matrix, shifting, by the processor, the second subset of element values one register to the left in the plurality of registers of the first storage device, wherein the second subset of element values is then stored to the first storage device;
performing, by the processor, a simultaneous multiplication of the each remaining value with a corresponding subset of element values of the first matrix;
for each simultaneous multiplication, storing, by the processor, a result of the each simultaneous multiplication in at least one accumulator connected to the processor; and
outputting, by the processor, an output from the at least one accumulator as a first row of an output feature map (OFM),
the first element value from among the x*y elements of the second matrix in the first simultaneous multiplication being different from the second element value from among the x*y elements of the second matrix in the second simultaneous multiplication,
wherein the at least one accumulator comprises a first accumulator configured to add the result of the each simultaneous multiplication to an input value, and a second accumulator coupled to an output of the first accumulator and configured to add the result of the each simultaneous multiplication to an input value and output the first row of the OFM.

18. The method of claim 17, further comprising:
storing, by the processor, the second matrix in a second storage device of the processor, the second matrix having dimensions x by y, wherein x is a number of rows in the second matrix and y is a number of columns in the second matrix;
storing, by the processor, in the first storage device connected to the processor, the first subset of element values of the first matrix having dimensions n by m, wherein n is a number of rows in the first matrix and m is a number of columns in the first matrix; and
storing, by the processor, in the first storage device, the second subset of element values of the first matrix.

* * * * *